(12) United States Patent
Matsuba et al.

(10) Patent No.: US 6,467,078 B1
(45) Date of Patent: Oct. 15, 2002

(54) PROGRAM DEVELOPMENT SYSTEM, METHOD FOR DEVELOPING PROGRAMS AND STORAGE MEDIUM STORING PROGRAMS FOR DEVELOPMENT OF PROGRAMS

(75) Inventors: Harumi Matsuba, Tokyo; Masahiko Watanabe, Kanagawa, both of (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/346,233

(22) Filed: Jul. 1, 1999

(30) Foreign Application Priority Data

Jul. 3, 1998 (JP) .......................................... 10-189513

(51) Int. Cl.[7] .............................................. G06F 9/44
(52) U.S. Cl. ...................... 717/100; 717/101; 717/120; 717/135; 707/500.1; 707/504; 703/3; 703/13
(58) Field of Search ................................ 717/4, 8, 7, 1, 717/100, 101, 135, 120; 713/323; 703/3, 13, 16, 17, 19; 712/8; 707/500.1, 504

(56) References Cited

U.S. PATENT DOCUMENTS

| | | | | |
|---|---|---|---|---|
| 5,469,553 A | * | 11/1995 | Patrick ........................ 713/323 |
| 5,544,305 A | * | 8/1996 | Ohmaye et al. ............. 345/776 |
| 5,794,040 A | * | 8/1998 | Ono et al. .................... 717/100 |
| 5,933,633 A | * | 8/1999 | Good et al. ...................... 717/1 |
| 5,940,617 A | * | 8/1999 | Tamura .......................... 717/4 |
| 6,145,121 A | * | 11/2000 | Levy et al. ................... 717/135 |
| 6,192,512 B1 | * | 2/2001 | Chess .......................... 717/127 |
| 6,205,575 B1 | * | 3/2001 | Sherman et al. ............. 717/127 |
| 6,226,789 B1 | * | 5/2001 | Tye et al. ........................ 717/7 |
| 6,230,114 B1 | * | 5/2001 | Hellestrand et al. .......... 703/17 |
| 6,263,459 B1 | * | 7/2001 | Schibilla ..................... 714/710 |
| 6,324,495 B1 | * | 11/2001 | Steinman ..................... 703/17 |
| 6,324,600 B1 | * | 11/2001 | Brice et al. .................... 710/33 |
| 6,341,262 B1 | * | 1/2002 | Damani et al. ............... 703/16 |

FOREIGN PATENT DOCUMENTS

| | | |
|---|---|---|
| JP | 63-182752 | 7/1988 |
| JP | 2-250123 | 10/1990 |
| JP | 4-123143 | 4/1992 |

(List continued on next page.)

OTHER PUBLICATIONS

Title: A Software design method for Ada based real time system, atuhor: Gonna, ACM, Jul. 1989.*
Title: A logic for real–time discrete event processes, IEEE, author: Ostroff: J.S, Jun. 1990.*
Title: Software development of real–time systems, author: Hassan Gomma, ACM, Jul. 1986.*
Title: Method and Device for simulating program generator utilization specification, Jul. 4, 1995, Pub# JP407168709A.*

Primary Examiner—Gregory Morse
Assistant Examiner—Chameli C. Das
(74) Attorney, Agent, or Firm—Scully, Scott, Murphy & Presser

(57) ABSTRACT

There is disclosed a program development system, a method for developing programs and a storage medium storing programs for development of programs by which the reduction in development periods of a program to be incorporated into a real time control system and the improvement of qualities are realized. A program development system comprises a state transition storing section to store a state transition matrix, a processing time storing section to store processing time required for an action described in each cell in the state transition matrix, and a simulator to obtain processing time required for a simulation of operations of a system by accumulating events inputted sequentially and time information corresponding to a cell specified sequentially by a state inputted as an initial state or a state subsequent to transition described in each cell.

30 Claims, 20 Drawing Sheets

FOREIGN PATENT DOCUMENTS

| | | |
|---|---|---|
| JP | 4-184545 | 7/1992 |
| JP | 5-307511 | 11/1993 |
| JP | 7-160537 | 6/1995 |
| JP | 7-234807 | 9/1995 |
| JP | 8-115107 | 5/1996 |
| JP | 9-325952 | 12/1997 |
| JP | 10-003405 | 1/1998 |
| JP | 10-091480 | 4/1998 |

* cited by examiner

Fig.3

| | S/F | motor A (1) | motor B under writing (2) | motor B under reading (3) | motor B S2 standby (4) |
|---|---|---|---|---|---|
| card issue request | 1 | motor A:ON (0.5) | error message =>-(1) | error message =>-(1) | / |
| S1:OFF→ON | 2 | motor A:OFF motor B:ON writing =>under writing (4) | / | / | / |
| writing OK | 3 | / | reading =>under reading (1) | error reset reading=>-(2) | / |
| writing NG | 4 | / | writing =>-(3) | error reset reading=>-(2) | / |
| reading OK | 5 | / | error reset writing=>-(4) | =>S2 standby | / |
| reading NG | 6 | / | error reset writing=>-(4) | reading =>-(1) | / |
| S2:OFF→ON | 7 | / | / | / | motor B:OFF =>motor A (0.5) |

Fig.4

| | | motor A | motor B | | | simulation |
|---|---|---|---|---|---|---|
| | S/E | 1 | under writing 2 | under reading 3 | S4 standby 4 | start / end |
| card issue request | 1 | motor A:ON (0.5) | error message =>-(1) | error message =>-(1) | / | |
| S2:OFF→ON | 2 | motor A:OFF motor B:ON writing =>under writing (4) | | / | / | current state: motor B: under writing |
| writing OK | 3 | / | reading =>under reading (1) | error reset reading=>-(2) | / | |
| writing NG | 4 | / | writing =>-(3) | error reset reading=>-(2) | / | time accumulated up to current time: 4ms |
| reading OK | 5 | / | error reset writing=>-(4) | =>S4 standby | / | |
| reading NG | 6 | / | error reset writing=>-(4) | reading =>-(1) | / | |
| S4:OFF→ON | 7 | / | / | / | motor B:OFF =>motor A (0.5) | |

*Fig. 7*

*InitialState:ST1*

*Event:C_RQ*
*Property:TEST*
*Time:ABS(0)*
*From:Card Request Button*
*To:Card Task*

*Object:S1*
*Property:TEST*
*Time:ABS*
*StateChange:0(OFF)->5(ON)->6(OFF)*

*Object:S2*
*Property:TEST*
*Time:ABS*
*StateChange:0(OFF)->15(ON)->16(OFF)*

.

.

.

*Object:moterA*
*Property:VERIFY*
*Time:ABS*
*StateChange:0(ON)->5(OFF)*

*Object:moterB*
*Property:VERIFY*
*Time:ABS*
*StateChange:0(OFF)->5(ON)->14-16(OFF)*

Fig.11

| | | standby state for request | under writing | under reading |
|---|---|---|---|---|
| | S<br>E | 1 | 2 | 3 |
| writing | 1 | writing start<br>=>under writing<br>writing completion set<br>(1) | error return<br>=>-<br>(0.5) | error return<br>=>-<br>(0.5) |
| reading | 2 | reading start<br>=>under reading<br>reading completion set<br>(1) | error return<br>=>-<br>(0.5) | error return<br>=>-<br>(0.5) |
| writing completion | 3 | × | data flag set<br>writing completion<br>=>standby state<br>for request<br>(1) | / |
| reading completion | 4 | × | / | data flag set<br>reading completion<br>=>standby state<br>for request<br>(1) |

Fig.12

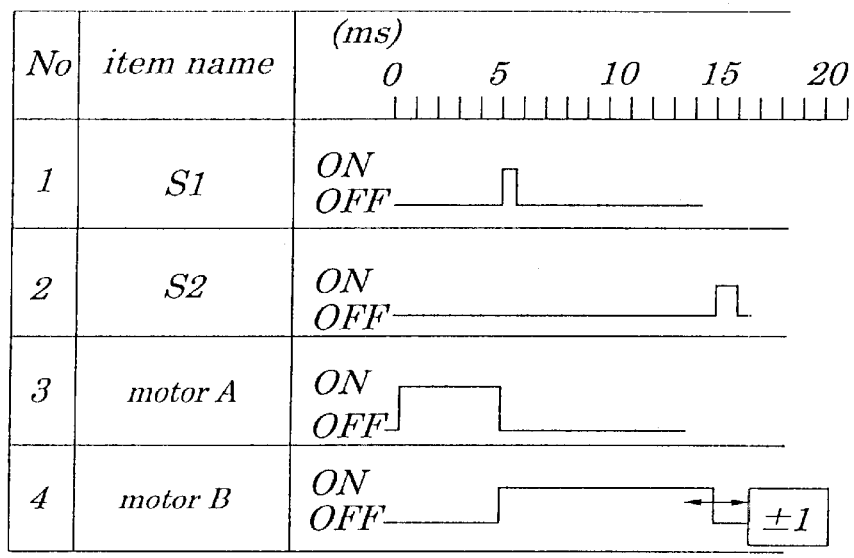

| | | motor A | motor B | | |
| --- | --- | --- | --- | --- | --- |
| | | | under writing | under reading | S2 standby |
| request for card issuance | | 0.2/0.3 | 0.1/0.1 | 0.1/0.1 | / |
| S1:OFF→ON | | 0.2/0.3 | | | / |
| writing | OK | / | 0.2/0.2 | 0.4/0.5 | / |
| | NG | / | 0.6/0.8 | 0.4/0.5 | / |
| reading | OK | / | 0.4/0.5 | 0.2/0.3 | / |
| | NG | / | 0.4/0.5 | 0.5/0.7 | / |
| S2:OFF→ON | | / | / | / | 0.2/0.2 |

45

PROGRAM DEVELOPMENT SYSTEM, METHOD FOR DEVELOPING PROGRAMS AND STORAGE MEDIUM STORING PROGRAMS FOR DEVELOPMENT OF PROGRAMS

BACKGROUND OF THE INVENTION

1. Field of the Invention

The present invention relates to a program development system, a method for developing programs and a storage medium storing programs for development of programs and more particularly to a program development system, a method for developing programs and a storage medium storing programs for development of programs to be suitably used for developing programs that can be incorporated into a real time control system such as various electronic apparatus including a facsimile, copying machine as well as a monitoring/controlling system including power facilities, which has to be controlled in real time.

2. Description of the Related Art:

A real time control system is required to carry out processing of an event which is a stimulus from the outside and inside of the system including reception of various signals, of a state which is a condition held by the system including a standby state to receive signals, of a combination of the above event and state and of a lot of actions to be executed by the system when a specific event occurs in a specified state. As one of approaches for developing programs to be incorporated into such a real time control system, a method using a State Transition Matrix is known. The State Transition Matrix is a two-dimensional matrix wherein an event or state is assigned to a string or a row and both the actions corresponding to a cell which is a point of intersection of an event and a state and the state subsequent to transition taking place after the action are arranged. Though the current real time control system has recently been made large-scale and increased in complexity, this method for developing programs allows basic design of the system by even a less experienced person, resulting in labor saving and acceleration of developing periods.

FIG. 22 is a block diagram showing an example of electrical configurations of a conventional program development system disclosed in Japanese Laid-open Patent Application No. Hei9-325952.

The program development system in this example is approximately composed of a definition matrix inputting section 1 to input information about abstract mechanical definition which defines, by using a hierachically related state transition matrix, an operation of a system including activity that means processing performed continuously during time required for processing in each state and in a current state, a storing section 2 to store the information about the inputted abstract mechanical definition as an abstract mechanical definition matrix, a state hierarchy extracting section 3 used to extract a hierarchical structure of a state from the abstract mechanical definition matrix read from the storing section 2, a forecast processing time calculating section 4 used to calculate a forecast processing time assigned to its lower state in each state in the abstract mechanical definition matrix and to judge whether or not the calculated result exceeds the forecast processing time of the state to be handled at present, and a warning display section 5 used to check the calculated result and to issue a warning if a total processing time required in the lower state exceeds that required in the upper state.

This configurations allows, prior to actual operations of a system, a verification, by using a combination of fragmentary information about processing time, that an operation is carried out without delay.

In the conventional program development system, the forecast processing time calculating section 4 is used to calculate the forecast processing time assigned to its lower state in each state in the abstract mechanical definition matrix and the warning display section 5 is employed to issue a warning if the total time required for processing in the lower state exceeds that in the upper state being handled at present.

However, the processing time is ideal time based on specifications of a real time control system and no consideration is given to a variety of actually occurring events.

Accordingly, when a program developed on the basis of such an abstract mechanical definition matrix is incorporated into a system, if a malfunction that the system is not actuated to specifications occurs, it is necessary to retrace steps to the extent that even basic design is amended, causing development periods longer. This is one disadvantage of the conventional system.

Another disadvantage of the conventional system is that, the development time is usually restricted within a limit and if such a malfunction as described above occurs at the last stage of the development, retracing steps to the extent that basic design is amended is not allowed and there would be no way but choose rough and temporizing amendments, thus degrading the quality of the system

SUMMARY OF THE INVENTION

In view of the above, it is an object of the present invention to provide a program development system, a method for developing programs and a storage medium storing programs for development of programs by which the reduction in development periods of a program to be incorporated into a real time control system and the improvement of qualities are realized.

According to a first aspect of the present invention, there is provided a program development system comprising:

a state transition matrix storing section having two or more cells designated by a state taken by a system for which a program is developed and by an event being a stimulus from the outside or inside of the system, and storing a state transition matrix describing contents of processing to be performed by the system or a state subsequent to transition;

a time information storing section to store time information corresponding to each cell in the state transition matrix; and a simulator to obtain processing time required for a simulation of operations of the system by accumulating events inputted sequentially and time information corresponding to a cell sequentially designated by a state inputted as an initial state and by a state subsequent to transition.

In the foregoing, a preferable mode is one wherein the program development system is provided with an inputting section to detect the designation of any of indication positions each corresponding to two or more events or states constituting the state transition matrix displayed in the display section and to input the positional information about the indication positions into the simulator and wherein the simulator comprises an analysis section to convert positional information inputted by the inputting section to an event code or state code corresponding to the display section, a state storing section to store a state corresponding to the state code or a state subsequent to transition described in each cell, a time accumulating section to accumulate the time information, and a state transition judging section to store a state corresponding to the state code, as the initial state, to the state storing section and to decide a corresponding cell based on an event corresponding to the event code and a state stored in the state storing section and by referring to a state transition matrix read from the state transition matrix storing section and, after reading time information corresponding to the decided cell, to store it to the time accumulating section, and further after reading the state subsequent to transition described in the decided cell, to store it to the state storing section.

Also, a preferable mode is one wherein the program development system is provided with an event inputting section to input the initial state and a test script file describing timing of occurrence of each event described in the state transition matrix or timing in operations of constituting factors of the system to be performed to specifications to the simulator and wherein the simulator comprises an event analysis section to create an event inputting sequence obtained by re-arranging, in order of occurrence time, two or more events in a test script file inputted by the event inputting section, a state storing section to store the initial state or a state subsequent to transition described in each cell, a time accumulating section to accumulate the time information, and a state transition judging section to store the initial state into a state storing section and to judge a cell based on an event to be captured, in order of an earlier time, from the event inputting sequence and the state stored in the state storing section and by referring to a state transition matrix read from the state transition matrix storing section and, after reading time information corresponding to the decided cell from the time information storing section, to accumulate it in the time accumulating section and, after reading a state subsequent to transition described in the decided cell from the state transition matrix storing section, to store it to the state storing section.

Also, a preferable mode is one wherein the program development system has a test script file creating section to create the test script file from history data of execution of the simulation performed by the simulator based on the initial state inputted by manipulating an operation section and two or more events.

Also, a preferable mode is one wherein the simulator is provided with a time comparison section adapted to subtract accumulated time being currently stored in the time accumulating section from occurrence time of the event and, if a positive result is obtained by the subtraction, to add the subtraction result, as a differential time, which is a difference between processing time required for instructions for processing of operations of peripheral devices from a control section constituting the system and processing time required for operations of peripheral devices to be performed in accordance with the processing instructions to the accumulated time being currently stored in the time accumulating section.

Also, a preferable mode is one wherein the state transition matrix storing section stores a state transition matrix of operations of a control section constituting the system and a state transition matrix of operations of peripheral devices controlled by the control section and wherein the time information storing section stores time information about operations of the control section and time information about operations of the peripheral devices, and wherein the simulator is composed of a first simulator to accumulate time information about operations of the control section and a second simulator to accumulate time information about operations of the peripheral devices independently of the first simulator.

Also, a preferable mode is one wherein the program development system is provided with a generator to create a source program written in a programming language to be incorporated into the system based on the state transition matrix, a compiler to convert the source program to an object program written in a machine language, a first calculating section to calculate time information corresponding to each cell by multiplying an operational speed of the control section constituting the system by code numbers of a machine language constituting the object program corresponding to the processing described in each cell in the state transition matrix or to transition before and after it.

Also, a preferable mode is one wherein the program development system is provided with a generator to create a source program written in a programming language to be incorporated into the system based on the state transition matrix, a compiler to convert the source program to an object program written in a machine language, an In-Circuit emulator or a code simulator adapted to execute the object program to allow processing of almost the same as actual operations of the system, and a second calculating section to calculate time information corresponding to each cell in the state transition matrix based on execution time obtained by the execution of the object program by the In-Circuit emulator or the code simulator.

Also, a preferable mode is one wherein the time information storing section is composed of at least two out of a first time information storing section to store time information inputted by manipulating the control section corresponding to each cell in the state transition matrix, a second time information storing section to store time information calculated by the first calculating section corresponding to each cell in the state transition matrix, or a third time information storing section to store time information calculated by the second calculating section corresponding to each cell in the state transition matrix, and a comparison section adapted to the simulator to compare accumulated results obtained by accumulating the corresponding time information at the time of simulation based on time information stored in at least two out of the time information storing sections 1 to 3.

Furthermore, a preferable mode is one wherein the time information storing section or the first time information storing section stores time information as values with a certain latitude or variables in accordance with a permissible range in specifications of the system and wherein the simulator is adapted to read the maximum value, minimum value, average values or values randomly selected out of the values with a certain latitude when time information corresponding to a specified cell is read from the time information storing section or the first time information storing section or to change the time information to be accumulated in accordance with the variables.

In the foregoing, it is preferable that the test script file is in a timing chart format, text format or message sequence chart format.

Also, it is preferable that the time information is processing time required for processing described in a corresponding cell.

Also, a preferable mode is one wherein the time information consists of the processing time and overhead time required for transition from a state or a processing to another state or another processing.

Furthermore, a preferable mode is one wherein the overhead time is uniform or varies depending on each cell or each transition.

According to a second aspect of the present invention, there is provided a method for developing a program comprising:

employing a state transition matrix storing section having two or more cells designated by a state taken by a system for which a program is developed and by an event being a stimulus from the outside or inside of the system, and storing a state transition matrix describing contents of processing to be performed by the system or a state subsequent to transition;

employing a time information storing section to store time information corresponding to each cell in the state transition matrix; and obtaining processing time required for a simulation of operations of the system by accumulating events inputted sequentially and time information corresponding to a cell sequentially designated by a state inputted as an initial state and by a state subsequent to transition.

In the above-mentioned second aspect, a preferable mode is one that wherein comprises the steps of:

employing an inputting section to detect the designation of any of indication positions each corresponding to two or more events or states constituting the state transition matrix displayed in the display section and to input the positional information about the indication positions into the simulator;

converting positional information inputted by the inputting section to an event code or state code corresponding to the display position;

storing a state corresponding the state code as the initial state to a state storing section;

deciding a cell based on an event corresponding to the event code and a state stored in the state storing section and by referring to a state transition matrix read from the state transition storing section;

reading time information corresponding to the decided cell from the time information storing section and accumulating it in the time accumulating section; and reading a state subsequent to transition described in the decided cell from the state transition matrix storing section and of storing it to the state storing section.

Also, a preferable mode is one that wherein comprises the steps of:

employing an event inputting section to input the initial state and a test script file describing timing of occurrence of each event described in the state transition matrix or timing in operations of constituting factors of the system to be performed to specifications;

creating an event inputting sequence obtained by re-arranging, in order of occurrence time, two or more events in a test script file inputted by the event inputting section;

storing the initial state to a state storing section;

deciding a corresponding cell based on an event captured in order of an earlier time from the event inputting sequence and a state stored in the state storing section and by referring to a state transition matrix read from the state transition matrix storing section;

reading time information corresponding to the decided cell from the time information storing section and accumulating it from a time accumulating section; and reading a state subsequent transition described in the decided cell from the state transition matrix storing section and storing it to the state storing section.

Also, a preferable mode is one that wherein comprises the step of creating the test script file from history data of execution of the simulation performed by the simulator based on the initial state inputted by manipulating an operation section and two or more events.

Also, a preferable mode is one that wherein comprises the steps of subtracting accumulated time being currently stored in the time accumulating section from occurrence time of the event and, if a positive result is obtained by the subtraction, and of adding the subtraction result, as a differential time, which is a difference between processing time required for instructions for processing of operations of peripheral devices from a control section constituting the system and processing time required for operations of peripheral devices to be performed in accordance with the processing instructions to the accumulated time being currently stored in the time accumulating section.

Also, a preferable mode is one that wherein comprises the steps of storing a state transition matrix of operations of a control section constituting the system and a state transition matrix of operations of peripheral devices controlled by the control section to the state transition matrix storing section, storing time information about operations of the control section and time information about operations of the peripheral devices to the time information storing section, accumulating time information about operations of the control section and accumulating time information about operations of the peripheral devices independently of the steps.

Also, a preferable mode is one that wherein comprises the steps of creating a source program written in a programming language to be incorporated into the system based on the state transition matrix, converting the source program to an object program written in a machine language, and calculating time information corresponding to each cell by multiplying an operational speed of the control section constituting the system by code numbers of a machine language constituting the object program corresponding to the processing described in each cell in the state transition matrix or to transition before and after it.

Also, a preferable mode is one that wherein comprises the steps of creating a source program written in a programming language to be incorporated into the system based on the state transition matrix, converting the source program to an object program written in a machine language, executing the object program and calculating time information corresponding to each cell in the state transition matrix based on execution time obtained by the execution of the object program.

Also, a preferable mode is one that wherein comprises the steps of employing the time information storing section composed of at least two out of a first time information storing section to store time information inputted by manipulating the control section corresponding to each cell in the state transition matrix, a second time information storing section to store time information calculated by the first calculating section corresponding to each cell in the state transition matrix, or a third time information storing section to store time information calculated by the second calculating section corresponding to each cell in the state transition matrix, and comparing accumulated results obtained by accumulating the corresponding time information at the time of simulation based on time information stored in at least two out of the time information storing sections 1 to 3.

Also, a preferable mode is one that wherein comprises the steps of employing the time information storing section or the first time information storing section which stores time information as values with a certain latitude or variables in accordance with a permissible range in specifications of the system, reading the maximum value, minimum value, average values or values randomly selected out of the values with a certain latitude when time information corresponding to a specified cell is read from the time information storing section or the first time information storing section or changing the time information to be accumulated in accordance with the variables.

Also, a preferable mode is one that wherein comprises the step of using the test script file being in a timing chart format, in a text file format or in a message sequence chart format.

Also, a preferable mode is one that wherein comprises a step of using the time information which is processing time required for the execution of processing described in a corresponding cell.

Also, a preferable mode is one that wherein comprises the step of using the time information which is overhead time required for transition from a state or a processing to another state or another processing.

Also, a preferable mode is one that wherein comprises the step of using the overhead time which is uniform or varies depending on each cell or each transition.

According to a third aspect of the present invention, there is provided a storage medium storing programs for development of programs to have a computer achieve functions described in the first aspect and the second aspect.

BRIEF DESCRIPTION OF THE DRAWING

The above and other objects, advantages and features of the present invention will be more apparent from the following description taken in conjunction with the accompanying drawings in which:

FIG. 3 is one of examples of a state transition matrix for operations of CPU constituting the above prepaid card selling machine;

FIG. 4 shows one example of a simulation mode screen displayed in a display section constituting a man-machine interface of the first embodiment;

FIG. 7 is one of examples of a test script file in the text file form to be used for a simulation in the second embodiment of the present invention;

FIG. 11 shows one of examples of a state transition state of operations of a magnetic head constituting a prepaid card selling machine for which a program is developed in the third embodiment of the present invention;

FIG. 12 shows one of examples of a test script file in a timing chart format to be used for the simulation in the third embodiment;

DETAILED DESCRIPTION OF THE PREFERRED EMBODIMENTS

Best modes of carrying out the present invention will be described in further detail using various embodiments with reference to the accompanying drawings.

First Embodiment

Figure 1:
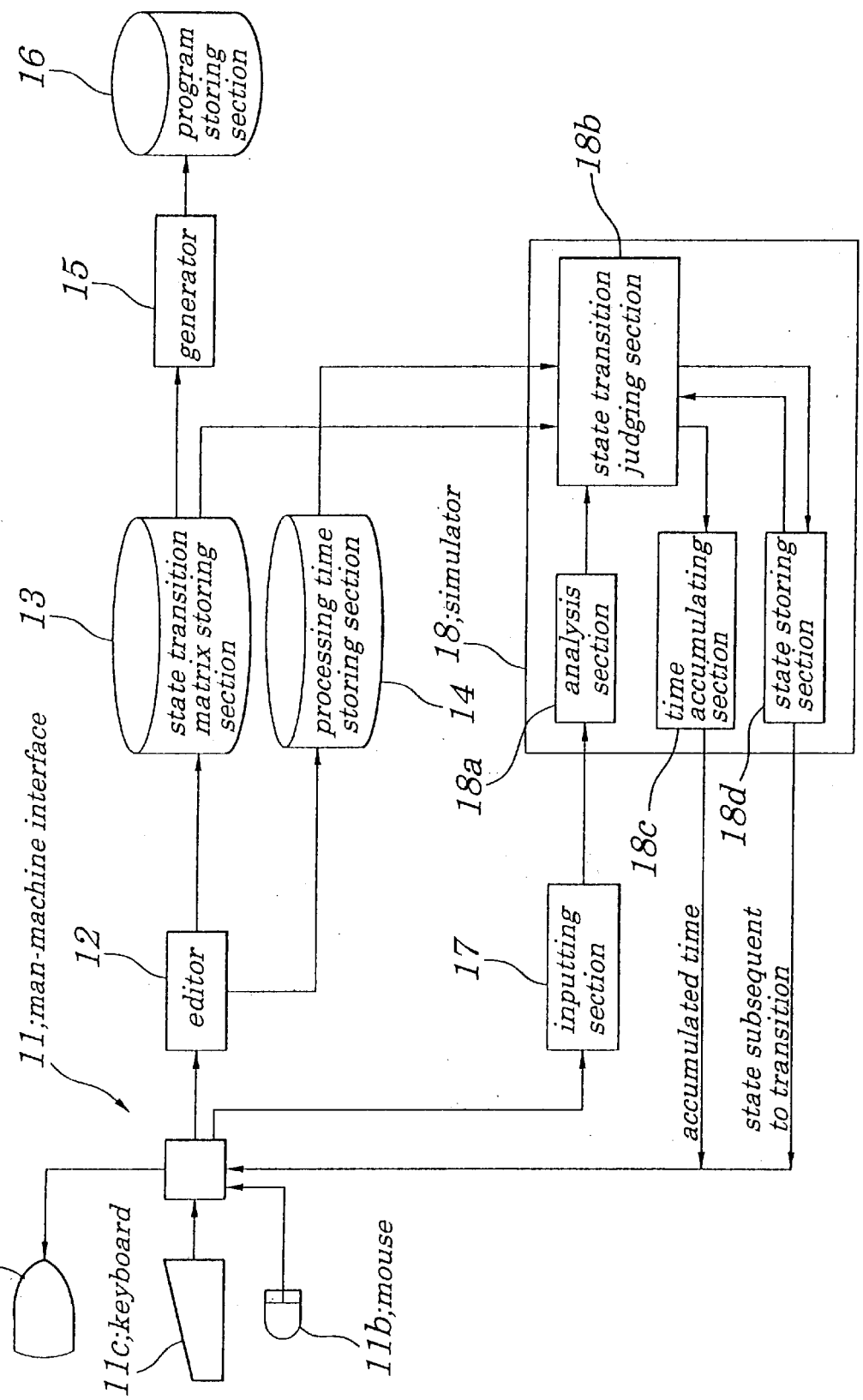
FIG. 1 is a block diagram showing electrical configurations of a program development system shown in a first embodiment of the present invention.

FIG. 1 is a block diagram showing electrical configurations of a program development system shown in a first embodiment of the present invention.

The program development system in this embodiment, as depicted in FIG. 1, approximately comprises a man-machine interface 11, an editor 12, a state transition matrix storing section 13, a processing time storing section 14, a generator 15, a program storing section 16, an inputting section 17, and a simulator 18.

The man-machine interface 11 is composed of a display section 11a, a mouse 11b and a keyboard 11c. It is used to input data (state, event, action, state subsequent to transition) required for an operator to create a state transition matrix by referring to a display contents of the display section 11a or by operating the mouse 11b or the keyboard 11c and/or to direct inputting of an event, in order to cause the simulator 18 to perform a simulation for every event based on the state transition matrix of a real time control system designed by a state transition matrix, by moving a cursor using a cursor key of the mouse 11b or the keyboard 11c to a display area of an event in the state transition matrix displayed in the display section 11a and by clicking or pressing a return key down. The simulation results (state subsequent to transition, accumulated time and the like) fed by the simulator 18 are displayed in the display section 11a. The processing time represents time required for an action described in each cell.

The editor 12 is used to create and edit the state transition matrix based on a state, event, action, state subsequent to transition, accumulated time and the like inputted using the man-machine interface 11 and also to store data on the state transition matrix and the processing time in the corresponding state transition matrix storing section 13 and processing time storing section 14. Both the state transition matrix storing section 13 and the processing time storing section 14 are composed of a storage medium having a large-scale memory capacity such as semiconductor memory including RAM, FD (floppy disk), HD (hard disk) and the like. Data on the state transition matrix is stored in the state transition matrix storing section 13 and processing time is stored in the processing time storing section 14.

The generator 15 is adapted to automatically generate a program (source program) to be incorporated into a real time control system described in a programming language such as C language (trade mark name) based on a state transition matrix read out from the state transition matrix storing section 13, and the program storing section 16 stores the generated program. The program storing section 16 is composed of a storage medium having a large-scale capacity such as semiconductor memory including RAM, FD or HD and stores the source program therein.

The inputting section 17 is adapted to detect a position of a cursor at the time when a left button of a mouse is clicked or a return key is pressed down by an operator after the cursor is moved by using a cursor key of the mouse 11b or the keyboard 11c to a display area of any event or state in the state transition matrix displayed in the display section la and feed the information about the position to an analysis section 18a. That is, the inputting section 17 in this embodiment functions as a position detecting section for an event or state.

The simulator 18 approximately comprises the analysis section 18a, a state transition judging section 18b, a time accumulating section 18c and a state storing section 18d. The analysis section 18a is adapted to convert the information about the position fed by the inputting section 17 to event or state codes corresponding to the position and to feed the resulting codes to the state storing section 18d. That is, the analysis section 18a functions as a section to convert the positional information to event/state codes. The state transition judging section 18b is used to control each constitutional factor in the simulator 18 and to set a state corresponding to the state code fed by the analysis section 18a, as an initialized state, to the state storing section 18d and to determine a corresponding cell, based on an event corresponding to the event code fed by the analysis section 18a and on a state stored in the state storing section 18d, by referring to the state transition matrix read out from the state transition matrix storing section 13. Moreover, the state transition judging section 18b is used to accumulate processing time corresponding to actions to be processed by the determined cell in the time accumulating section 18c by reading out it from the processing time storing section 14. Furthermore, the state transition judging section 18b is used to read a state subsequent to transition described in the cell determined by itself and to store it in the state storing section 18d, and to feed, every time one simulation is completed, accumulated time stored in the time accumulating section 18c and the state subsequent to transition stored in the state storing section 18d to the man-machine interface 11. The time accumulating section 18c and the state storing section 18d are composed of semiconductor memory such as RAM and store accumulated time and a state subsequent to transition respectively.

Figure 2:
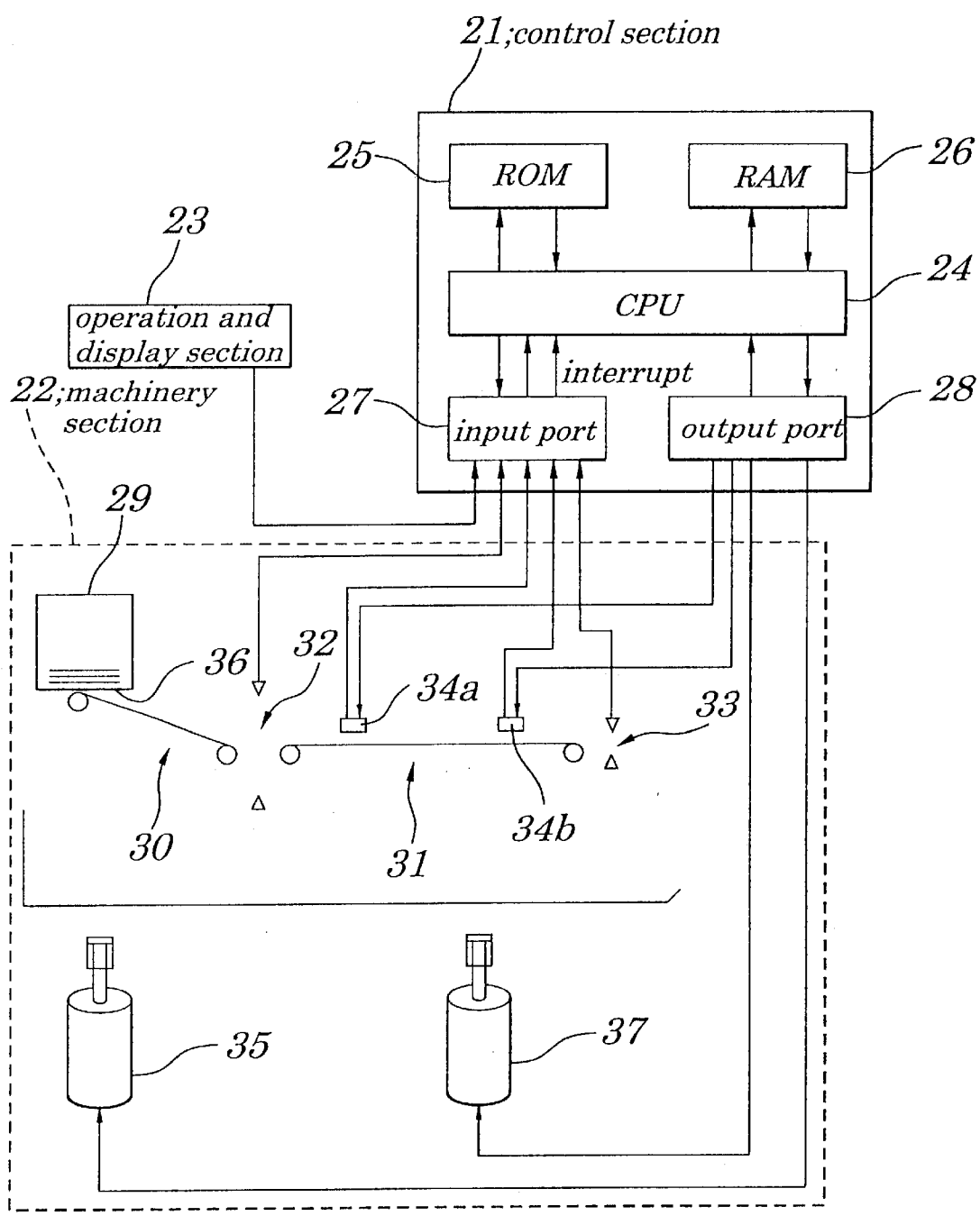
FIG. 2 is a schematic diagram illustrating a rough configuration of a prepaid card selling machine for which a program is developed.

Operations of the program development device having configurations described above are further described in detail. A program to be developed by the program development device is presumed to be a program to be incorporated into a prepaid card selling machine as shown in FIG. 2. The prepaid card here represents an approximately name-card-sized plastic card which can be purchased at a predetermined price and can be used to buy goods, passenger cards and the like as a substitute for cash.

The prepaid card selling machine approximately comprises a control section 21 to control a machinery section 22 and an operation and display section 23, the machinery section 22 to issue the prepaid card, the operation and display section 23 which is operated by a purchaser of the prepaid card for buying and is referred to its displaying portion. The control section 21 approximately comprises a CPU (central processing unit) 24, ROM 25 to store the above programs, RAM 26 used by the CPU 24 to execute programs, an input port 27 to feed a detection signal or an interrupt signal supplied by each constitutional factor constituting the machinery section 22 and the operation and display section 23 to the CPU 24, and an output port 28 used by the machinery section 22 to feed a control signal to a motor 35 and 37 constituting the machinery section 22.

The machinery section 22 is composed of a stacker 29, a card taking-out mechanism 30, a card transfer mechanism 31, sensors 32 and 33, a magnetic head 34a for writing magnetic data, and a magnetic head 34b for reading magnetic data. Operations of the machinery section 22 are as follows.

When a purchaser feeds cash into a cash supply port (not shown) of the operation and display section 23 and presses down a card-type designating button (not shown) and a card-issue designating button (not shown), a motor constituting, together with a roller and a belt, the card taking-out mechanism 30 is driven and, from a stacker storing two or more prepaid cards 36 with a belt-shaped magnetic stripe having no magnetic data (to be called a "raw card"), one raw card 36 is taken out and transferred in the downward direction as shown in FIG. 2. Then, when the raw card 36 is detected by a sensor 32 composed of a photo coupler and the like, a motor 35 is stopped and a motor 37 constituting, together with a roller and a belt, the card transfer mechanism 31 is driven to transfer the raw card 36 in a transfer path in the right direction and a magnetic data containing a purchase amount or a card issuing date is written on the magnetic stripe of the raw card 36 by a magnetic head 34a fitted on the transfer path. In order to check if currently written magnetic data is correct, a prepaid card on which magnetic data has just been written is transferred on the transfer path in the right direction as shown in FIG. 2, and a magnetic head 34b reads the magnetic data from the prepaid card. If the read data is judged to be correct, after the prepaid card is transferred further in the right direction on the transfer path as shown in FIG. 2 and is detected by a sensor 33 composed of a photo coupler, the card is ejected from the card issuing port (not shown) and the motor 37 is stopped simultaneously. The operations of the machinery section 22 described above are controlled by the CPU 24, based on a program stored in ROM 25, through the input port 27 and the output port 28.

Let it be supposed that specifications of the prepaid card selling machine describe that it should take 15 ms to issue one prepaid card, processing time required for operations in the card taking-out mechanism 30 is 5 ms and processing time required for operations in the card transfer mechanism 31 is 10 ms. In addition, let it be supposed that one prepaid card is issued in one operation.

In order to create a state transition matrix as shown in FIG. 3, an operator inputs necessary data (state, event, action, state subsequent to transition, processing time and the like) by operating the mouse 11b and the keyboard 11c, while referring to a display of the display section 11a constituting the man-machine interface 11, based on specifications of the above prepaid card selling machine. The editor 12, using the above data, creates the state transition matrix as shown in FIG. 3, displays it on the display section 11a constituting the man-machine interface 11 and stores data on the state transition matrix and processing time at a specified area of each of the state transition matrix storing section 13 and the processing time storing section 14.

Referring to FIG. 3, a motor A and a motor B correspond to a motor 35 and a motor 37 shown in FIG. 2 respectively, and a mark S1 and a mark S2 represent a sensor 32 and a sensor 33 in FIG. 2 shown in FIG. 2 respectively. In the uppermost line of the matrix in FIG. 3, the "Motor A" represents that the motor 35 stops being in the standby state to receive an instruction for issuing a prepaid card or the motor 35 is in the driving state (hereinafter referred to as "State 1"); the "Motor B: Under writing" representing that the motor 37 is in the driving state and in the state where magnetic data is being written on the raw card 36 by a magnetic head 34a (hereinafter as "State 2"); the "Motor B: Under reading" representing that the motor 37 is in the driving state and in the state where magnetic data of the prepaid card is being read by the magnetic head 34b (hereinafter as "State 3"); and the "Motor B: S2 standby" representing that the motor 37 is in the driving state and in the standby state to receive a detection signal from the sensor 33 while the prepaid card is ejected from the issuing port (hereinafter as "State 4"). Moreover, the "Motor B" represents that the state is in the upper one in the State 2 to State 4.

In the most left column of the matrix in FIG. 3, the "Card issue request" represents that the issue of the card has been requested by the supply of cash or the pressing-down of a specified button by a purchaser of the card (hereafter as "Event 1"); the "S1:OFF→ON" representing that a detection signal from the sensor 32 has changed from "OFF" to "ON" due to the passage of the raw card 36 through the sensor 32 (hereafter as "Event 2"); the "Writing: OK" representing receipt of a notice that writing of magnetic data consisting of purchasing amounts, an issue date of a card and the like to a magnetic stripe of the raw card 36 by the magnetic head 34a has normally been completed (hereinafter as "Event 3"); the "Writing: NG" representing receipt of a notice that abnormal writing of magnetic data to the raw card 36 by the magnetic head 34a has occurred (hereinafter as "Event 4"); the "Reading: OK" representing receipt of a notice that reading of magnetic data from a prepaid card by the magnetic head 34b has normally been completed (hereinafter as "Event 5"); the "Reading: NG" representing receipt of a notice that abnormal reading of magnetic data from a prepaid card by the magnetic head 34b has occurred (hereinafter as "Event 6"); the "S2: OFF→ON" representing that a detection signal of the sensor 33 has changed from OFF to ON due to the arrival of a prepaid card through the sensor 33 to the card issuing port (hereinafter as "Event 7").

The Event 1 is called a message-type event which represents receipt of an actuating message from other tasks or devices and the Event 2 and Event 7 are called a flag-type event which represents reading of a variable or a change of inputting/outputting. Moreover, the Event 3 to Event 6 are called an interrupt event which represents receipt of an interrupt from the outside.

In the state transition matrix shown in FIG. 3, if a point of intersection of an event and a state, for example, of the State 1 and the Event 2 is represented as a cell (1, 2), contents described by each cell have the following meanings. That is, in the cell (1,1) shown in the matrix in FIG. 3, the "Motor A: ON" represents an action to actuate the motor 35 in order to take out the raw card 36 from the stacker 29, in the standby State 1 to receive an instruction for issuing a prepaid card and in response to the occurrence of the Event 1 of the request for issuing a prepaid card directed by the supply of cash or the pressing-down of a specified button by a purchaser of the card. The numeric values (0.5) represents that time required for processing the above action is 0.5 ms. The reason that a state subsequent to transition is not described is that the operation remains in the present state. i.e., in the State 1.

In the cell (1, 2), the "Motor A: OFF, Motor B: ON, Writing" represents actions to switch a transfer of the raw card 36 from a transfer by use of the card taking-out mechanism 30 to a transfer by use of the card transfer mechanism 31 in response to the occurrence of the Event 2 where a detection signal from the sensor 32 has changed from "OFF" to "ON" due to the passage of the raw card 36 through the sensor 32 and to stop the driving of the motor 35 in order to write magnetic data on the raw card and simultaneously to drive the motor 37 and further to request the magnetic head 34a to write specified magnetic data on the card. Moreover, in the cell (1, 2), the "=>Under writing" represents that the state subsequent to transition is the State 2 and the numeric value (4) shows that total time required for processing a series of the above actions is 4 ms.

In the cell (1, 3) of the matrix in FIG. 3, the mark "/" represents that no action is implemented and no transition of a state takes place therein. The meaning of the mark "/" is the same as in other places in the table and accordingly its description is omitted in other places.

In the cell (2, 1), the "Error Message" represents an action to display a message, on a display device of the operation and display section 23 constituting the prepaid card selling machine, that, in the State 2 where magnetic data is being written on the raw card 36 by the magnetic head 34a, if the Event 1 of a request for further issuing a prepaid card occurs, it is impossible to issue the requested card because only one prepaid card can be issued in one operation as defined in the specifications. In the same cell (2, 1), the symbol "=>–" represents that the operation remains in the present state. i.e., in the State 2. The numeric value (1) shows time required for processing the above actions is 1 ms.

In the cell (2, 3), the "Reading" represents an action to request the magnetic head 34b to read magnetic data of the prepaid card that has just been written to check if the magnetic data that has just been written on the prepaid card is correct, in the State 2 where magnetic data is being written on the raw card 36 by the magnetic head 34a and in response to the occurrence of the Event 3 wherein a notice is given by the magnetic head 34a informing of normal writing of magnetic data. In the cell (2, 3), the "=>Under reading" represents that a state subsequent to transition is the State 3 and the numeric value (1) shows that time required for processing the above action is 1 ms.

In the cell (2, 4), the "Writing" represents an action to request the magnetic head 34a to again write the same magnetic data on the prepaid card which a failure in writing has occurred thereon, in the State 2 wherein magnetic data is being written on the raw card 36 by the magnetic head 34a and in response to the occurrence of the Event 4 wherein a notice has been given by the magnetic head 34a informing of abnormal writing of the magnetic data. In the same cell (2, 4), the symbol "=>–" represents that the operation remains in the present state. i.e., in the State 2. The numeric value (3) shows time required for processing the above actions is 3 ms.

In the cell (2, 5), the "Error Reset, Writing" represents an action to request the magnetic heads 34a and 34b to perform initializations and to again write the same magnetic data on a prepaid card based on a judgement that abnormality has happened in the magnetic heads 34a and 34b, in the State 2 wherein magnetic data is being written on the raw card 36 by the magnetic head 34a, i.e., even in the state requesting the magnetic head 34a to write magnetic data and in the case of the occurrence of the Event 5 wherein a notice is given by the magnetic head 34a informing of normal writing of magnetic data. In the same cell (2, 5), the symbol "=>–" represents that the operation remains in the present state. i.e., in the State 2. The numeric value (4) shows time required for processing the above actions is 4 ms.

In the cell (2, 6), the "Error Reset, Writing" represents an action to request the magnetic heads 34a and 34b to perform initializations and to again write the same magnetic data on a prepaid card based on a judgement that abnormality has occurred in the magnetic heads 34a and 34b, in the State 2 wherein magnetic data is being written on the raw card 36 by the magnetic head 34a, i.e., even in the state requesting the magnetic head 34a to write magnetic data and in the case of the occurrence of the Event 5 wherein a notice is given by the magnetic head 34b informing of abnormal reading of magnetic data from the prepaid card. In the same cell (2, 6), the symbol "=>–" represents that the operation remains in the present state, i.e., in the State 2. The numeric value (4) shows time required for processing the above actions is 4 ms.

In the cell (3, 1), the "Error Message" represents an action to display a message, on a display device of the operation and display section 23 constituting the prepaid card selling machine, that, in the State 3 where magnetic data is being read from the prepaid card:, if the Event 1 of a request for further issuing a prepaid card occurs, it is impossible to issue the requested card because only one prepaid card can be issued in one operation as defined in the specifications. In the same cell (3, 1), the symbol "=>–" represents that the operation remains in the present state, i.e., in the State 3. The numeric value (1) shows time required for processing the above actions is 1 ms.

In the cell (3, 3), the "Error Reset, Reading" represents an action to request the magnetic heads 34a and 34b to perform initializations and to again read the magnetic data from a prepaid card based on a judgement that abnormality has occurred in the magnetic heads 34a and 34b, in the State 3 wherein magnetic data is being read from the prepaid card, i.e., even in the state requesting the magnetic head 34a to read magnetic data and in the case of the occurrence of the Event 3 wherein a notice is given by the magnetic head 34a informing of normal writing of magnetic data on the prepaid card. In the same cell (3, 3), the symbol "=>–" represents that the operation remains in the present state, i.e., in the State 3. The numeric value (2) shows time required for processing the above actions is 2 ms.

In the cell (3, 4), the "Error Reset, Reading" represents an action to request the magnetic heads 34a and 34b to perform initializations and to again read the magnetic data from a prepaid card based on a judgement that abnormality has occurred in the magnetic heads 34a and 34b, in the State 3 wherein magnetic data is being read from the prepaid card, i.e., even in the state requesting the magnetic head 34a to read magnetic data and in the case of the occurrence of the Event 4 wherein a notice is given by the magnetic head 34a informing of abnormal writing of magnetic data on the prepaid card. In the same cell (3, 4), the symbol "=>–" represents that the operation remains in the present state, i.e., in the State 3. The numeric value (2) shows time required for processing the above actions is 2 ms.

In the cell (3, 5), no description of an action and processing time is provided. This is because, in the State 3 wherein magnetic data is being read from a prepaid card, if an Event 5 occurs wherein a notice is supplied by the magnetic head 34b informing of normal reading of magnetic data from the prepaid card, it is possible to judge that magnetic data has normally been written on the prepaid card to be issued, requesting for no action to be executed in this cell and no processing time to be considered. Moreover, in the cell (3, 5), the "=>S2 standby" represents that a state subsequent to transition is the State 4.

In the cell (3, 6), the "Reading" represents an action to request the magnetic head 34b to read magnetic data from a prepaid card which has failed in reading magnetic data, in the State 3 wherein magnetic data is being read from the prepaid card and in response to the occurrence of the Event 6 wherein a notice is given by the magnetic head 34b informing of abnormal reading of magnetic data. In the same cell (3, 6), the symbol "=>–" represents that the operation remains in the present state, i.e., in the State 3. The numeric value (1) shows time required for processing the above actions is 1 ms.

In the cell (4, 7), the "Motor B:OFF" represents an action to stop the driving of the motor 37 in preparation for a request for issuing a next prepaid card, in the standby State 4 to receive a detection signal fed from the sensor 33 during the driving of the motor 37 and in response of the occurrence of the Event 7 wherein a detection signal fed from the sensor 33 has changed from the OFF to ON state due to the arrival of the prepaid card through the sensor 33 to a card issuing port. the "=>Motor A" represents that a state subsequent to transition is the State 1 and the numeric value (0.5) shows that time required for processing the above action is 0.5 ms.

Then, when an operator operates the mouse 11b or the keyboard 11c constituting the man-machine interface 11 according to specifications of the above prepaid card selling machine and puts this program development system into a simulation mode in order to perform a simulation for every one event using a simulator 18 based on the above state transition matrix, a simulation mode screen appears on the display section 11a as shown in FIG. 4.

Figure 5:
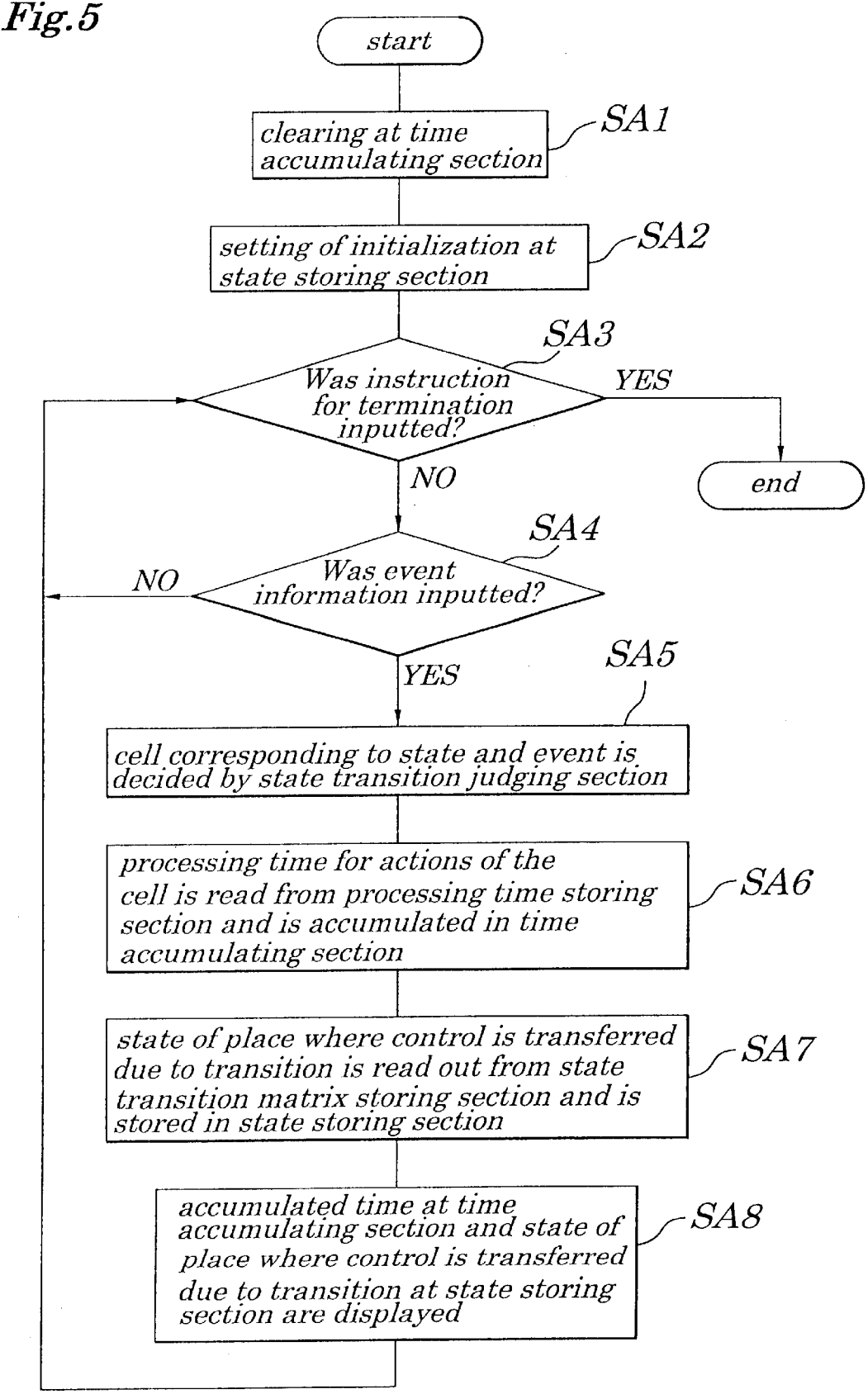
FIG. 5 is a flow chart showing operations of a simulator of the first embodiment.

Operations of the inputting section 17 and the simulator 18 as well as steps taken by an operator when processing time required by the CPU 24 for the passage of the raw card 36 through the sensor 33 after the passage through the sensor 32 is obtained are hereinafter described with reference to a flow chart shown in FIG. 5.

An operator moves, using the cursor key of the mouse 11b or keyboard 11c, the cursor to the START area for a simulation displayed on the upper part of the simulation mode screen shown in FIG. 4, clicks the left button of the mouse or presses the return key down and then provides an instruction to the simulator 18 to start the simulation. In response to this instruction, the state transition judging section 18b goes to step SA1 for processing, after clearing stored contents of the time accumulating section 18c to 0 ms, and further to step SA2.

Furthermore, the operator moves the cursor, using the cursor key of the mouse 11b or the keyboard 11c, to a display area of a state which is selected as an initial state for the simulation to be performed (in this case, a State 1 where the motor 35 is now driving, i.e., "Motor A" in FIG. 4) out of two or more states provided in the state transition matrix shown on the left side of the simulation mode screen shown in FIG. 4 and click the left button of the mouse or press the return key down.

Then, the inputting section 17 detects a position of the cursor existing in the display area of the state selected by the operator and feeds its positional information to the analysis section 18a, and the analysis section 18a converts the positional information supplied by the inputting section 17 to a state code corresponding to the above position (in this case, the State 1) and feeds it to the state transition judging section 18b. The state transition judging 18b, at step SA 2, sets the state (in this case, State 1) corresponding to the state code fed by the analysis section 18a, as the initial state, to the state storing section 18d and, after making it displayed on the display section 11a, goes to step SA3.

Moreover, the operator moves the cursor, using the cursor key of the mouse 11b or the keyboard 11c, to a display area of en event the occurrence of which is desired and which is selected out of two or more states provided in the state transition matrix shown on the left side of the simulation mode screen depicted in FIG. 4 and clicks the left button of the mouse or presses the return key down.

Then, the inputting section 17 detects a position of the cursor existing in the area of the event selected by the operator and feeds its positional information to the analysis section 18a, and the analysis section 18a converts the positional information supplied by the inputting section 17 to an event code corresponding to the above position and feeds it to the state transition judging section 18b. When the operator moves the cursor, by using the cursor key of the mouse 11b or the keyboard 11c, to a display area of the Event 2 wherein the detection signal of the sensor 32 has changed from the OFF to the ON state by the passage of the raw card 36 through the sensor 32 (S1:OFF→ON in FIG. 4), the inputting section 17 detects a position of the cursor existing in the display area of the Event 2 and feeds its positional information to the analysis section 18a and then the analysis section 18a converts the positional information supplied by the inputting section 17 to the event code of the Event 2 corresponding to the position and feeds it to the state transition judging section 18b.

At step SA3, the state transition judging section 18b judges whether the instruction for terminating the simulation has been provided or not, when the cursor is moved by the operator, by using the cursor key of the mouse 11b or the keyboard 11c, to the "END" area where the instruction for the termination of the simulation is provided and which is displayed on the upper part of the simulation mode screen and when the left button of the mouse is clicked or pressed down. If the judgement result turns out to be "YES", the state transition judging section 18b terminates the simulation processing.

On the other hand, if the judgement result turns out to be "NO", i.e., if an instruction for terminating the simulation is not provided by the operator, the state transition judging section 18b goes to step SA4. In the example, because the event code of the Event 2 has been fed to the state transition judging section 18b, the judgement result at step SA3 turns out to be "NO" and the state transition judging section 18b goes to step SA4.

The state transition judging section 18b, at step SA4, judges whether the code supplied by the analysis section 18a is an event code or not. If the judgement result turns out to be "NO", it returns back to step SA3, while, if the judgement result at step SA4 is "YES", i.e., the code supplied by the analysis section 18a is an event code, the state transition judging section 18b goes to step SA5. In this case, because the state transition judging section 18b is provided with the event code of the Event 2, the judgement result at step SA4 turns out to be "YES" and the state transition judging section 18b goes to step SA5.

The state transition judging section 18b, at step SA5, by referring to the state transition matrix read from the state transition storing section 13, based on the event corresponding to the event code supplied by the analysis section 18a and on the state stored in the state storing section 18d and, after deciding a corresponding cell, goes to step SA6. At this point, because the event code of the Event 2 is supplied by the analysis section 18a and the State 1 is stored in the state storing section 18d, the state transition judging section 18b, by referring to the state transition matrix, decides a cell (1, 2). Moreover, if the operator desires the occurrence of an Event 3, i.e., an event that a notice is given by the magnetic head 34a informing of normal completion of writing magnetic data, though a cell (1, 3) is decided at step 10 SA5, because the cell (1, 3) has a description of "/" representing that no action is taken and no transition of a state takes place, the state transition judging section 18b, without carrying out processing from step SA6 to SA8, returns back to step SA4 through step SA3 and is in the standby state to receive a subsequent event.

At step SA6, the state transition judging section 18b, after checking functions of an action processed by the cell decided at step SA5, reading processing time corresponding to the action from the processing time storing section 14 and having the time accumulated in the time accumulating section 18c, goes to step SA7. In the example, the state transition judging section 18b checks functions of the action to stop the driving of the motor 35 and to drive the motor 37 as well as to request the magnetic head 34a to write magnetic data, which is processed by the cell (1, 2) and, after reading processing time (4 ms) corresponding to the action from the processing time storing section 14 and adding the read processing time to the accumulated time (0 ms), has the added processing time accumulated in the time accumulating section 18c. At step SA7, the state transition judging section 18b, after reading out a state subsequent to transition described by a cell decided at step SA5 from the state transition matrix storing section 13 and storing it in the state storing section 18d, goes to step SA8. In the example, because the cell (1, 2) has a description of "=>Under writing" representing that a state subsequent to transition is the State 2 and the State 2 information is stored in the state transition matrix storing section 13, the state transition judging section 18b reads out the State 2 from the state transition matrix storing section 13 and stores it in the state storing section 18d.

At step SA8, the state transition judging section 18b feeds time accumulated in the time accumulating section 18c and the state subsequent to transition stored in the state storing section 18d to the man-machine interface 11 and, after having them displayed on the display section 11a, returns back to step SA 3. In the example, because "4 ms" as the accumulating time is stored in the time accumulating section 18 and the State 2 is stored as a state subsequent to transition in the state storing section 18d, these are displayed in the display section 11a of the man-machine interface 11 as shown in FIG. 4.

The state transition judging section 18b repeats processing at steps SA4 to SA8 until the judgement result at step SA3 turns out to be "NO".

If the "Writing: OK", i.e., the Event 3 is selected as an event the occurrence of which is desired next by an operator, because the state subsequent to transition resulting from the previous simulation is the State 2, the cell (2, 3) is decided and the time of "1 ms "is added and the accumulated time of "5 ms" resulting from the addition is stored in the time accumulating section 18c, and the state subsequent to transition, i.e., the State 3 is stored in the state storing section 18d. In the same manner, if the "Reading: OK", i.e., the Event 5 is selected as an event the occurrence of which is desired next by an operator, because the state subsequent to transition resulting from the previous simulation is the State 3, the cell (3, 5) is decided, however, since the processing time is not described in the cell (3, 5), the previous accumulated time "5 ms" is maintained in the time accumulating section 18c, and the state "S2 Standby" of the place subsequent to transition, i.e., the State 4 is stored in the state storing section 18d. Moreover, if the "S2: OFF→ON", i.e., the Event 7 is selected as an event the occurrence of which is desired next by an operator, because the state subsequent to transition resulting from the previous simulation is the State 4, the cell (4, 7) is decided and the accumulated time "5.5 ms" resulting from the addition of "0.5 ms" is stored in the accumulating section 18c, and the "Motor A" of the state subsequent to transition, i.e., the State 1 is stored in the state storing section 18d.

The accumulated time of "5.5 ms" obtained by the operation of the simulator 18 described above is processing time required by the CPU 24 during the transition of a state from a cell (1, 2) →a cell (2, 3)→a cell (3, 5)→a cell (4, 7). On the other hand, the time required for the passage of the prepaid card through the sensor 33 after the passage through the sensor 32 is decided depending on physical factors such as the number of revolutions or torque of the motor 37 or the moving distance of the prepaid card, and according to design specifications, it is, for example, "10±1 ms". As a result, this shows that the processing of the CPU is completed during the 10 ms for which the prepaid card passes through the card transfer mechanism 31.

It is also understood from FIG. 3 that, in order to see, in simulation, the execution of processing of re-writing and re-reading due to a failure, one time for each, in writing and reading of magnetic data on and from the prepaid card, the addition of a cell (2, 4) (action of re-writing) and cell (3, 6) (action of re-reading) to the transition of a state of a cell (1, 2) cell (2, 3) cell (3, 5) cell (4, 7) described above. This results in the accumulated time being "9.5 ms".

This result does not comply with the requirement of the lower limit of "9 ms" defined by specifications, causing the operator to review the program for the CPU 24 or the design of the card transfer mechanism 31.

Accordingly, if the execution of the processing to specifications cannot be seen in simulation, the operator, by referring to the display section 11a constituting the man-machine interface 11 and by operating the mouse 11b or the keyboard 11c, changes the processing time described in each cell of the state transition matrix shown in FIG. 3 to the level within a permissible range defined by the specifications and, by seeing again the execution in simulation through the use of the simulator 18, checks if the processing is carried out to the specifications.

In the above description, an example of the simulation to be performed by an operator's selection of an event for every event using the mouse 11b or the keyboard 11c is provided, however, by providing a means to store data on an order of a selected event (hereinafter as an "inputted event log") to the inputting section 17, the subsequent simulation can be performed through use of the inputted event log.

Thus, according to the configurations of the embodiment, since it is possible to perform a simulation based on processing time set for each action described in each cell in the state transition matrix, the simulation is allowed to specifications at the stage of basic design, achieving the reduction in time required for developments and the improvement in the quality.

Second Embodiment

Figure 6:
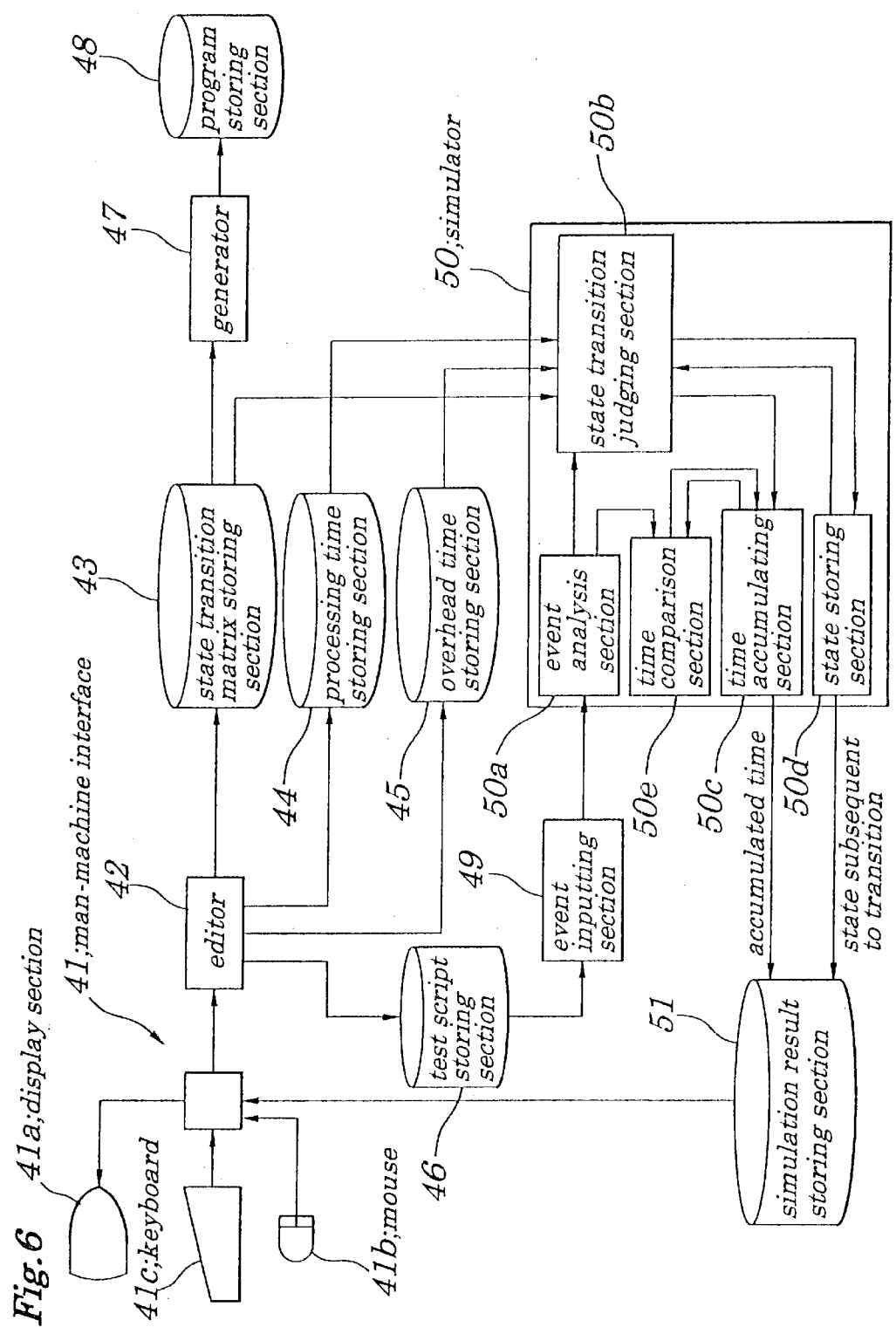
FIG. 6 is a block diagram showing electrical configurations of a program development system shown in a second embodiment of the present invention.

FIG. 6 is a block diagram showing electrical configurations of a program development system shown in a second embodiment of the present invention.

The program development system of the embodiment approximately comprises a man-machine interface 41, an editor 42, a state transition matrix storing section 43, a processing time storing section 44, an overhead time storing section 45, a test script storing section 46, a generator 47, a program storing section 48, an event inputting section 49, a simulator 50 and a simulation result storing section 51. The man-machine interface 41 composed of a display section 41a, a mouse 41b and a keyboard 41c is used to allow an operator to input, by referring to indications of the display section 41a and by actuating the mouse 41b or the keyboard 41c, data required for the creation of a state transition matrix (a state, event, action, state subsequent to transition, processing time and the like), overhead time and events required to perform a simulation based on the state transition matrix of a real time control system designed by the state transition matrix, into the simulator 50 and used to cause results (state subsequent to transition, accumulated time and the like) read from the simulation result storing section 51 to be displayed in the display section 41a. The overhead time represents time required for the completion of the transition from a state or an action to other state or action. For example, when a CPU detects an interrupt request, time is required to store contents of a register within the CPU in a stack, to set an address to be interrupted to a program counter and to fetch a program to be interrupted, i.e., the time is required for implementing actions other than those described in each cell. This time is called "overhead time". This overhead time is required when operations are restored from the interrupt processing as well. Since the simulation in the first embodiment is rough, the overhead time is not taken into consideration, however, in the second embodiment, because a more realistic simulation is performed as if the system were actually operated, this overhead time is taken into consideration in the processing. In this embodiment, the overhead time is set uniformly to 0.5 ms.

The editor 42 is used to create and edit the state transition matrix based on a state, action, state subsequent to transition, processing time and the like inputted using the man-machine interface 41 and to store data on the state transition matrix, processing time and overhead time into the state transition matrix storing section 43, the processing time storing section 44, the overhead time storing section 45 respectively.

Moreover, the editor 42 is adapted to create and edit a test script file used to instruct the simulator 50 to perform a simulation based on events and the like inputted through the use of the man-machine interface 41 and to store the file into the test script storing section 46. The test script file represents a file in timing-chart, text file or message sequence chart form describing the timing of occurrence of each event or the timing of operations of constructive factors of the real time control system required to instruct the simulator 50 to perform a simulation based on t he state transition matrix of a real time control system designed according to the state transition matrix. In this embodiment, a test script file in the text file form is used as the test script file as shown in FIG. 7.

Each of the state transition matrix storing section 43, the processing time storing section 44, the overhead time storing section 45 and the test script storing section 46 is composed of semiconductor memory such as RAM, and a memory medium having large-scale capacity such as FD, HD and the like, and stores data on the state transition matrix, processing time, overhead time and test script file respectively.

The generator 47 is adapted to automatically generate a program (source program) described in a programming language to be incorporated into the real time control system based on data on the state transition matrix read from the state transition matrix storing section 43 and the generated program is stored in the program storing section 48. The program storing section 48 is composed of semiconductor memory such as RAM and the like, and a memory medium having large-scale memory capacity such as FD, HD and the like and is used to store the source program therein.

The event inputting section 49 reads the test script file from the test script storing section 46 and feeds it to the simulator 50.

The simulator 50 approximately comprises an event analysis section 50*a*, a state transition judging section 50*b*, a time accumulating section 50*c*, a state storing section 50*d* and a time comparison section 50*e*. The event analysis section 50*a* is adapted to re-arrange, in order of the time of occurrence, two or more events of the test script file fed by the event inputting section 49 and to create an event inputting sequence described later (refer to FIG. 9) and to feed it to the state transition judging section 50*b*.

The state transition judging section 50*b* controls each constructive factor within the simulator 50 and decides a corresponding cell based on an event inputting sequence supplied from the event analysis section 50*a* and on the state stored in the state storing section 50*d* and by referring to the state transition matrix read from the state transition storing section 43. The state transition judging section 50*b* is adapted to read the processing time corresponding to an action processed by the decided cell from the processing time storing section 44 and to have it accumulated in the time accumulating section 50*c*, and also to read the overhead time required for the transition from the state currently existing in the cell to the state designated as a state subsequent to the transition from the overhead time storing section 45 to have it accumulated in the time accumulating section 50*c*. The state transition judging section 50*b* is adapted to read the state subsequent to transition from the state transition matrix storing section 43 and to store it into the state storing section 50*d* and, after the completion of the simulation, it stores the time accumulated in the time accumulating section 50 and the state subsequent to transition stored in the state storing section 50*d* as a result of the simulation result into the simulation result storing section 51. Each of the time accumulating section 50*c* and the state storing section 50*d* is composed of semiconductor memory such as RAM and the like and stores the accumulated time and the state subsequent to transition respectively.

The time comparison section 50*e* is adapted to subtract the accumulated time being currently stored in the time accumulating section 50*c* from the time when an event having an event inputting sequence created by the event analysis section 50*c* has occurred and, if a result from the calculation turns out to be positive, the calculated result is added, as differential time, to the time accumulated being currently stored in the time accumulating section 50*c*.

When CPU issues an instruction to request a peripheral device to carry out processing, the time required by the peripheral device for performing the processing in response to the instruction is ordinarily longer than that required by the CPU for giving the instruction to the peripheral device. The difference in time between them is called "differential time". For example, the time required by the CPU 24 for implementing the action of "Motor A: ON" in a cell (1, 1) of the state transition matrix shown in FIG. 3 is 1 ms, including the overhead time; while the time required by the raw card 36 taken out from the stacker 29 by the card taking-out mechanism 30 for reaching the sensor 32 is 5 ms. Since the required time of "5 ms" is physically decided under the structural constraints of the card taking-out mechanism 30, its change is impossible unless a driving capacity of the motor 35 or a distance for passage of the card is altered. The difference in time between 1 ms for the processing time required by the CPU and 5 ms required by the card taking-out mechanism is differential time.

In the simulation performed in the first embodiment, only the processing time required by the CPU is taken into consideration. However, in the real time control system on which a program to be developed is mounted, because not only the processing time required by the CPU but also operation time required by peripheral devices must be considered, the above embodiment cannot provide a simulation as if the system were more actually operated. Accordingly, in this embodiment, a simulation which takes differential time into consideration is to be performed.

The simulation result storing section 51 consists of semiconductor memory such as RAM and a memory medium having large-scale capacity such as FD, HD and the like and a simulation result containing accumulated time and state subsequent to transition is stored therein.

Operations of the program development system in this embodiment are hereinafter described. A program to be developed by the program development system is a program to be incorporated into the prepaid card selling machine shown in FIG. 2, as in the first embodiment, and accordingly, the specifications of the prepaid card selling machine are the same as in the first embodiment.

An operator, by referring to indications of the display section 41*a* constituting the man-machine interface 41 and by actuating the mouse 41*b* or the keyboard 41*c*, inputs data (state, event, action, state subsequent to transition, processing time and the like) required for creating the state transition matrix based on operations and specifications of the above prepaid card selling machine. This allows the editor 42 to create the state transition matrix and to display it at the display section 41*a* constituting the man-machine interface 41 and then to store the state transition matrix and processing time at specified memory areas of the state transition matrix storing section 43 and processing time storing section 44. The state transition matrix is the same as that in the first embodiment (FIG. 3) and its description is omitted accordingly.

The operator, by referring to indications of the display section 41*a* constituting the man-machine interface 41 and by actuating the mouse 41*b* and the keyboard 41*c*, inputs events described below, occurring timing and other data (hereinafter as simulation data) in order to instruct the simulator 50 to perform a simulation based on the above state transition matrix according to specifications of the above prepaid card selling machine.

Let it be supposed that, in the standby State 1 to receive an instruction to issue a prepaid card, a detection signal is changed from the OFF to ON state 5 ms after the occurrence of an Event 1 of a request for issuing the prepaid card and, 1 ms after, an Event 2 occurs that the detection signal is changed from the ON to OFF. Furthermore, let it be supposed that the magnetic head 34a informs, 1 ms after receiving a request for writing magnetic data, that the action is normally completed and that the magnetic head 34b, 1 ms after receiving a request for reading magnetic data, that the action is normally completed; that is, the Event 3 and Event 5 have occurred. Again, let it be supposed that, in the standby State 4 to receive a detection signal from the sensor 33, 15 ms after the occurrence of the Event 1, a detection signal of the sensor 33 is changed from the OFF to the ON state and, 1 ms after, the Event 7 occurs that the detection signal is again changed to the OFF state.

The operator, by referring to indications of the display section 41a constituting the man-machine interface 41 and by actuating the mouse 41b and the keyboard 41c, inputs data (hereinafter verification data) on an operational state to show according to specifications in order to compare the data with results from the simulation.

According to specifications, the motor 35 is to be driven until 5 ms elapse after the occurrence of the Event 1 and the motor 37 is to be driven only during a period from 5 ms to 14~16 ms after the occurrence of the Event 1.

The simulation data and verification data described above are edited, in the editor 42, to a text file such a test script file as shown in FIG. 7 and are stored in the test script storing section 46. Referring to FIG. 7, the "InitialState:ST1" represents that the initial state at the time of a start of a simulation is the State 1. The "Event:" shows an occurrence of an event not accompanied by a change of a state; for example, the "C_RQ" is a request for an issuance of a prepaid card. The "Object :" represents that parts, equipment or the like written after a mark ":" are an object to be simulated or verified in the paragraph. For example, the "S1" shows a description of a change of a state of the sensor 32. The "Property :" represents that data in the paragraph is simulation data (TEST) or verification data (VERIFY). The "Time:" represents that the time when the change of a state described under the line occurs is absolute time (ABS) or relative time (REL). The "ABS (0)" in the paragraph of the "Event :" C_RQ" shows that an event of a request for an issuance of a prepaid card occurs at absolute time of 0 ms. The "From:" and "To :" represents a source of an event and a place to which the occurrence of the event is transferred respectively. The "StateChange :" represents how the state of the object changes with the passage of time according to a statement described after the mark of ":". For example, "0 (OFF)–>5 (ON) –>6 (OFF)" shows that the state is OFF at 0 ms; ON 5 ms after and again OFF at 6 ms. Moreover, the test script file is created by taking the above differential time into consideration.

When an operator, in order to have a simulator 50 perform a simulation based on specifications of the above prepaid card selling machine, by manipulating the mouse 41b or the keyboard 41c constituting the man-machine interface 41, puts this program development system in a simulation mode, a simulation mode window provided with a "START" area to instruct the display section 41a to start a simulation is displayed.

Figure 8:
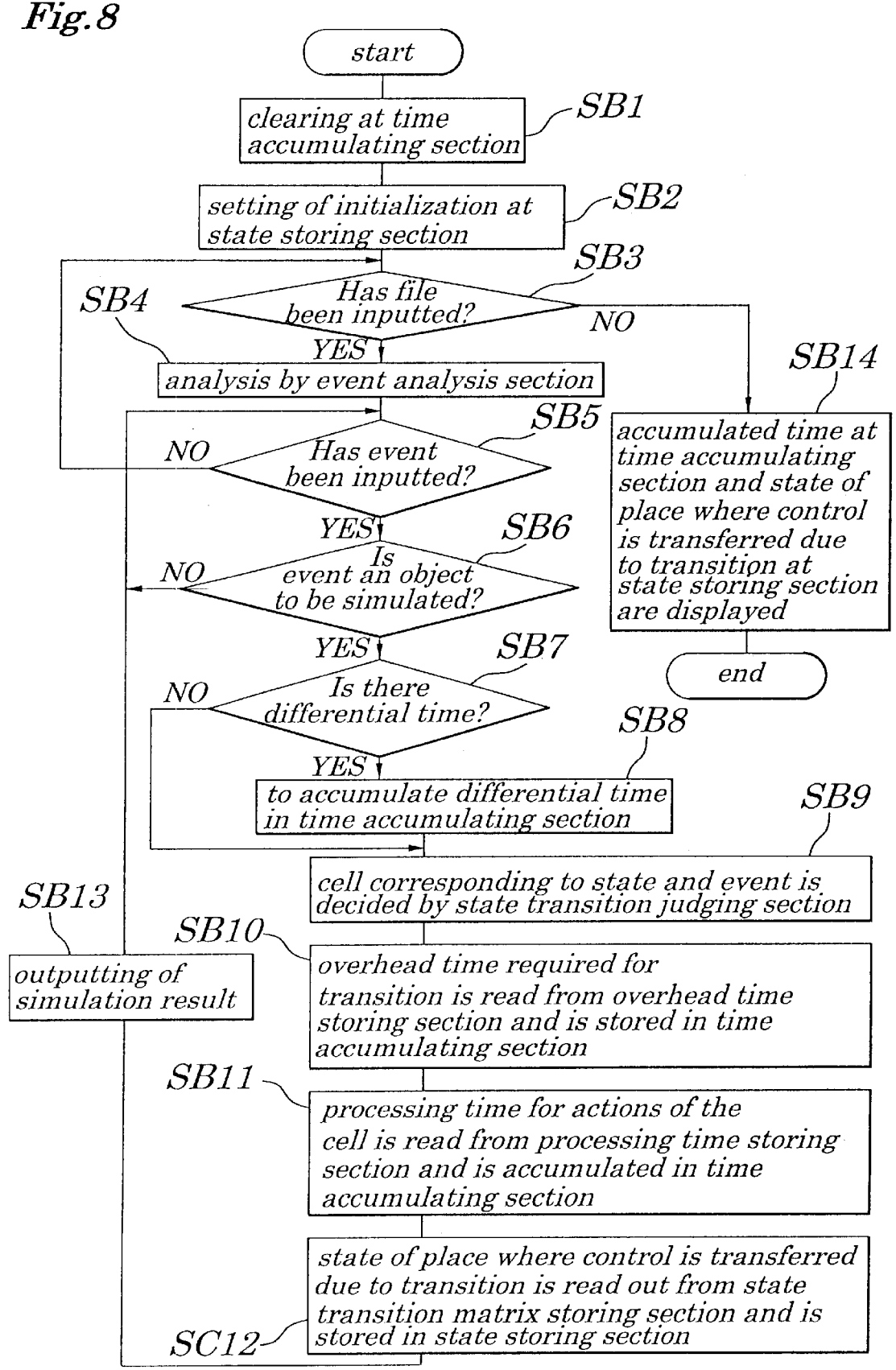
FIG. 8 shows a flow chart illustrating operations of the simulations in the second embodiment of the present invention.

Operations of the simulator 50 and manipulations of an operator to obtain processing time required by the CPU for an issuance of a prepaid card following a purchaser's press-down of a card issuance instruction button (not shown) of the operation and display section 23 are described with reference to a flow chart shown in FIG. 8.

An operator, after moving a cursor to a "START" area to provide instructions for a start of a simulation displayed in a simulation mode window by using a cursor key of the mouse 11b or the keyboard 11c and by clicking the left button of the mouse 11b and pressing down the return key, instructs the simulator 50 to start a simulation. This allows the state transition judging section 50b to go to step SB1 for clearing contents of the time accumulating section 50c to 0 ms and then to step SB2. The state transition judging section 50b reads a head statement of a test script file supplied by the event inputting section 49 at step SB2, sets a corresponding state, as an initial state, to the state storing section 18d and goes to step SB3. In the example, as "InitialState: ST1" is described as a head statement in the test script file shown in FIG. 7, the State 1 is set, as an initial state, to the state storing section 50d.

Figure 9:
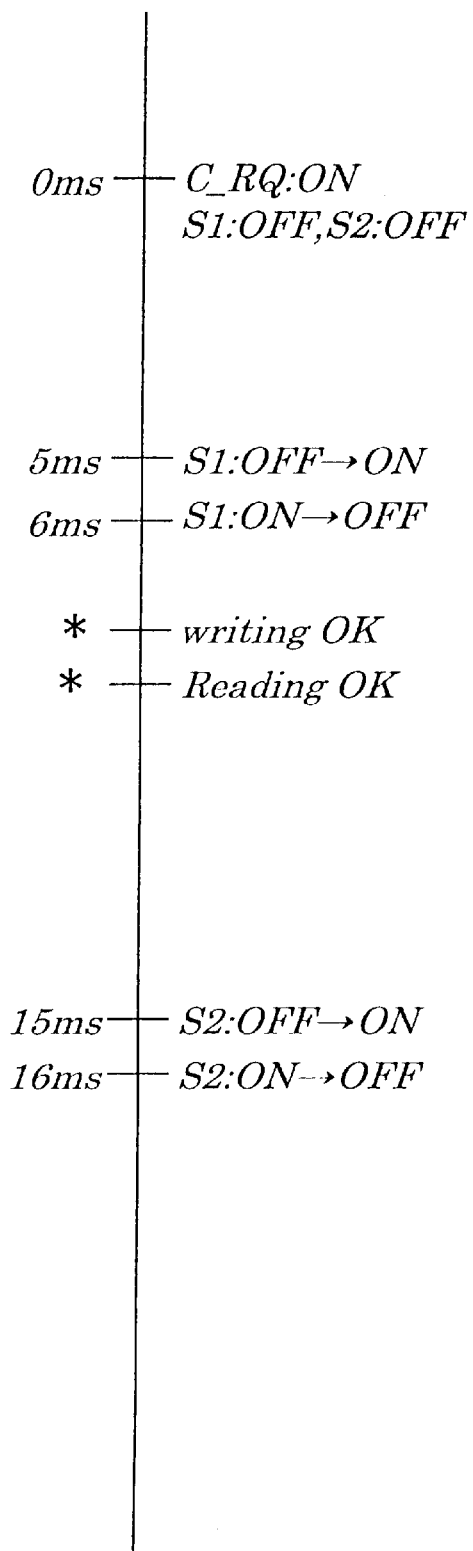
FIG. 9 is one of examples of an event inputting sequence created from the test script file shown in FIG. 7.

At step SB3, the state transition judging section 50b judges whether a test script file to be inputted to the event analysis section 50a from the event inputting section 49 exists or not. If the judgement made at step SB3 turns out to be "YES", i.e., there exists a test script file to be inputted to the event analysis section 50a from the event inputting section 49, the state transition judging section 50b, after inputting the test script file to the event analysis section 50a from the event inputting section 49 and goes to step SB4. In this example, as the test script file shown in FIG. 7 is stored in the test script storing section 46, the judgement formed at step SB3 turns out to be "YES" and the state transition judging section 50b inputs the test script file to the event analysis section 50a from the event inputting section 49. At step SB4, the event analysis section 50 creates an event inputting sequence (see FIG. 9) obtained by re-arranging two or more events in the test script file inputted from the event inputting section 49 in order of time of occurrence and, after feeding it to the state transition judging section 50b, goes to step SB5. In this example, the event inputting sequence shown in FIG. 9 is created from the test script file shown in FIG. 7.

At step SB5, the state transition judging section 50b reads the event inputting sequence from the event analysis section 50a in order of an earlier time and judges whether there is an event to be brought about. If the judgement result is "YES", the state transition judging section 50b, after capturing an event being earliest in terms of time out of events to be brought about and the occurrence time, goes to step SB6.

On the other hand, if the judgement result is "NO" at step SB5, the event inputting sequence is scanned in order of an earlier time, and if there is no event to be brought about, a judgment is made that the simulation based on one test script file is complete and operations return back to step SB3 to judge whether there is a test script file to be tested. In this example, the simulation is the first one to be performed based on the test script file shown in FIG. 7 and, as there is an event to be brought about in the event inputting sequence read from the event analysis section 50a, the judgement result at step SB5 is "YES" and the state transition judging section 50b, after capturing an event "C_RQ" being an earliest event out of the event inputting sequence shown in FIG. 9 and its occurrence time (0 ms), goes to step SB6.

At step SB6, the state transition judging section 50b, by referring to the state transition matrix read from the state transition matrix storing section 13, judges whether the captured event is an object to be simulated. If the result is judged to be "NO", the state transition judging section 50b returns back to step SB5. On the other hand, if the judgement result is "YES" at step SB6, i.e., the captured event is any of events described in the state transition matrix and is an object to be simulated, the state transition judging section 50b goes to step SB7. In this example, the event "C_RQ" is described as the Event 1 and, as it is an object to be simulated, the result at step SB6 is judged to be YES.

At step SB7, the time comparison section 50e subtracts the accumulated time being currently stored in the time accumulating section 50c from the time of occurrence of an event that the state transition judging section 50b has captured and judges whether the subtracted result is positive, i.e., there is differential time. If the result is judged to be "NO", the time comparison section 50e goes to step SB9. If the result is judged to be "YES"; i.e., there is differential time, the time comparison section 50e goes to step SB8. In the example, the Event 1 is an event of a request for issuance of a prepaid card and is not related to an instruction by which the CPU 24 instructs a peripheral device to perform processing and, accordingly, there is no differential time, and the judgement result at step SB7 is "NO", and the time comparison section 50e goes to SB9.

At step SB8, the time comparison section 50e adds the differential time to the accumulated time being now stored in the time accumulating section 50c and, after storing the result of the addition in the time accumulating section 50c, goes to step SB9.

At step SB9, the state transition judging section 50b, after deciding a cell, based on an event captured from the event analysis section 50a and a state stored in the state storing section 18d and by referring to the state transition matrix read from the state transition matrix storing section 13, goes to step SB10. In this example, the state transition judging section 50b, as the Event 1 has been captured from the event analysis section 50a and the State 1 has been stored in the state storing section 50d, decides a cell (1, 1) by referring to the state transition matrix.

At step SB10, the state transition judging section 50b, adds the overhead time. read from the overhead time storing section 45 to accumulated time being accumulated in the time accumulating section 50c, stores the result of the addition in the time accumulating section 50c and goes to step SB11. In the example, the state transition judging section 50b adds the overhead time (0.5 ms) read from the overhead time storing section 45 to the accumulated time (0 ms) being now stored in the time accumulating section 50c and store the result of the addition (0.5 ms) in the time accumulating section 50c.

At step SB11, the state transition judging section 50b, after checking a function of an action to be processed by a cell decided at step SB9 and reading processing time corresponding to the action from the processing time storing section 44 and adding it to accumulated time stored in the time accumulating section 50c and then storing the result of the addition to the time accumulating section 50c, goes to step SB12. In the example, the state transition judging section 50b checks the function of the action to actuate the motor 35, which is processed by a cell (1, 1), and reads processing time (0.5 ms) corresponding to the action from the processing time storing section 44 to add it to the time (0.5 ms) accumulated up to date which is being stored in the time accumulating section 50c, and then store the result (1 ms) of the addition in the time accumulating section 50c.

At step SB12, the state transition judging section 50b reads the state subsequent to transition described in the cell decided at step SB9 from the state transition storing section 43, stores it to the state storing section 50d. In this example, since the state subsequent to transition is not described in a cell (1, 1), the state subsequent to transition is not changed and the State 1 remains stored in the state storing section 18d.

At step SB13, the state transition judging section 50b stores the time accumulated in the time accumulating section and the state subsequent to transition stored in the state storing section 50d, as a simulation result, into the simulation result storing section 51 and then returns back to step SB5. In the example, the accumulated time (1 ms) and the state subsequent to transition (State 1) are stored as a simulation result into the simulation result storing section 51.

On the other hand, if the judgement result at step SB3 is "NO", i.e., the test script file is not continuously inputted into the event analysis section 50a from the event inputting section 49, the state transition judging section 50b judges that the simulation based on all test script files stored in the test script storing section 46 is completed and goes to step SB14.

At step SB41, the state transition judging 50b reads the simulation result stored in the simulation result storing section 51, feeds it to the man-machine interface 41 and then terminates the simulation processing. By this, on the display section 41a of the man-machine interface 41, a simulation result obtained up to now is displayed.

Referring to FIG. 9, occurrences of an event to be brought at an early time following the event "C_RQ" in the event inputting sequence and events occurring thereafter and simulations corresponding to these are described below. Moreover, in the description below, though a detailed explanation of processing at each step in the flow chart shown in FIG. 8 is omitted, after the processing at steps SB3 to SB13 are repeated, it is needless not to say that, in the end, the processing at step SB14 is to be performed.

First, the state transition judging section 50, captures the event "S1: OFF→ON" and the occurrence time (5 ms) by referring to the event inputting sequence in FIG. 9. Since the event "S1:OFF→ON" is described as the Event 2 in the state transition matrix shown in FIG. 3 and is an object to be simulated, the time comparison section 50e subtracts the accumulated time (1 ms) being currently stored in the time accumulating section 50c from the occurrence time (5 ms) of the Event 2. Because the result of the subtraction is positive (4 ms), the time comparison section 50e, after adding the differential time (4 ms) to the accumulated time (1 ms) being now stored at the time accumulating section 50c, stores its result of the addition (5 ms) into the time accumulating section 50c.

The state transition judging 50b, after deciding a cell (1, 2) based on the Event 2 captured from the event analysis section 50a and the State 1 being stored in the state storing section 18d and by referring to the state transition matrix, reads the overhead time (0.5 ms) out of the overhead time storing section 45 and adds it to the accumulated time (5 ms) being stored in the time accumulating section 50c and then stores the result of the addition (5.5 ms) into the time accumulating section 50c. The state transition judging section 50b, after checking a function of an action of stopping the driving of the motor 35 and starting the driving of the motor 37 to be processed in a cell (1, 2) and of requesting for writing magnetic data into the magnetic head 34a, reads the accumulated time (4 ms) from the processing time storing section 44 and adds it to the accumulated time (5.5 ms) being now stored in the time accumulating section 50*c* and then stores the result of the addition (9.5 ms) into the time accumulating section 50*c*.

The state transition judging section 50*b*, after reading the state subsequent to transition (State 2) described in a cell (1, 2) from the state transition matrix storing section 43 and storing it into the state storing section 50*d*, stores the time (9.5 ms) accumulated in the time accumulating section 50*c* and the state subsequent to transition (State 2) stored in the state storing section 50*d* as simulation results into the simulation result storing section 51.

The state transition judging section 50*b* captures the state "S1:ON→OFF" and its occurrence time (6 ms) by referring to the event inputting sequence shown in FIG. 9, however, the event "S1:ON→OFF" is not described in the state transition matrix in FIG. 3 and is not an object to be simulated, again by referring to the event inputting sequence, captures the event "Writing OK" and the occurrence time (*). Though the event "Writing OK" is described as the Event 3 in the state transition matrix shown in FIG. 3 and is an object to be simulated, the occurrence time (*) shows that the processing of the event "Writing OK" is executed subsequent to the previous processing, no differential time is produced.

Then, the state transition judging section 50*b*, after deciding a cell (2, 3) based on the Event 3 captured from the event analysis section 50*a* and the state (State 2) stored in the state storing section 18*d* and by referring to the state transition matrix shown in FIG. 3, reads overhead time (0.5 ms) from the overhead time storing section 45 and adds it to the accumulated time (9.5 ms) being stored in the time accumulating section 50*c* and then stores the result of the addition (10 ms) to the time accumulating section 50*c*. The state transition judging 50*b* checks a function of an action, which is processed by a cell (2, 3), of requesting the magnetic head 34*b* to read magnetic data of a prepaid card, reads processing time (1 ms) from the processing time storing section 44, adds it to the time accumulating section 50*c* and stores the result of its addition (11 ms) into the time accumulating section 50*c*.

The state transition judging 50*b*, after reading the state subsequent to transition (State 3) described in a cell (2, 3) from the state transition matrix storing section 43 and storing it into the state storing section 50*d*, stores the time (11 ms) accumulated in the time accumulating section 50*c* and the state subsequent to transition (State 3) as simulation results into the simulation result storing section 51.

The state transition judging section 50*b*, by referring to the event inputting sequence, captures the event "Reading OK" and the occurrence of time (*).

Though the event "Reading OK" is described as the Event 5 in the state transition matrix as shown in FIG. 3 and is an object to be simulated, the occurrence time (*) shows that the processing of the event "Reading OK" is executed subsequent to the previous processing, no differential time is produced.

Then, the state transition judging section 50*b*, after deciding a cell (3, 5) based on the Event 5 captured from the event analysis section 50*a* and the state (State 3) stored in the state storing section 18*d* and by referring to the state transition matrix shown in FIG. 3, reads the overhead time (0.5 ms) from the overhead time storing section 45 and adds it to the accumulated time (11 ms) being stored in the time accumulating section 50*c* and then stores the result of the addition (11.5 ms) to the time accumulating section 50*c*. The state transition judging 50*b*, though not making a check on a function of an action due to non-existence of any action to be processed in a cell (3, 5), reads processing time (0 ms) from the processing time storing section 44, adds it to the accumulated time (11.5 ms) now being stored in the time accumulating section 50*c*, stores the result of its addition (11.5 ms) in the time accumulating section 50*c*.

The state transition judging section 50*b*, after reading the state subsequent to transition (State 4) described in a cell (3, 5) from the state transition storing section 43 and storing it into the state storing section 50*d*, stores the accumulated time (11.5 ms) stored in the time accumulating section 50*c* and the state subsequent to transition (State 4) stored in the state storing section 50*d*, as simulation results, in the simulation result storing section 51.

The state transition judging section 50*b*, by referring to the event inputting sequence shown in FIG. 9, captures the event "S2:OFF→ON" and the occurrence time (15 ms). The event "S2: OFF→ON" is described as the Event 7 in the state transition matrix in FIG. 3 and is an object to be simulated, the time comparison section 50*e* subtracts the accumulated time (11.5 ms) being currently stored in the time accumulating section 50*c* from the occurrence time (15 ms) of the Event 7. Because the result of the subtraction is positive (3.5 ms), the time comparison section 50*e*, after adding the differential time (3.5 ms) to the accumulated time (15 ms) being now stored at the time accumulating section 50*c*, stores its result of the addition (15 ms) into the time accumulating section 50*c*.

Then, the state transition judging section 50*b*, after deciding a cell (4, 7) based on the Event 7 captured from the event analysis section 50*a* and the state (State 4) stored in the state storing section 18*d* and by referring to the state transition matrix shown in FIG. 3, reads the overhead time (0.5 ms) from the overhead time storing section 45 and adds it to the accumulated time (15 ms) being stored in the time accumulating section 50*c* and then stores the result of the addition (15.5 ms) to the time accumulating section 50*c*.

The state transition judging 50*b* checks a function of an action, which is processed by a cell (4, 7), for stopping of the motor 37, reads processing time (0.5 ms) from the processing time storing section 44, adds it to the time (15.5 ms) accumulated in the time accumulating section 50*c* and stores the result of its addition (16 ms) into the time accumulating section 50*c*.

Then, the state transition judging section 50*b*, after reading the state subsequent to transition (State 1) described in a cell (4, 7) and storing it into the state storing section 50*d*, stores the time (16 ms) accumulated in the time accumulating section 50 and the state subsequent to transition (State 1) stored in the state storing section 50*d* as simulation results, into the simulation result storing section 51.

Though the state transition judging section 50*b*, by referring to the event inputting sequence shown in FIG. 9, captures the event S2: ON→OFF" and its occurrence time (16 ms), the "S2:ON→OFF" is not described in the state transition matrix in FIG. 3 and is not an object to be simulated, it refers again to the event inputting sequence shown in FIG. 9. However, since all the event inputting sequences shown in FIG. 9 have occurred, the state transition judging 50*b* judges that a simulation based on one test script file is complete.

The simulation described above is an example wherein writing and reading on and from the magnetic data of a prepaid card have succeeded in one operation and the transition of a state is as follows: A cell (1, 1), →cell (1, 2)→cell (2, 3)→cell (3, 5)→cell (4, 7). This is hereinafter referred to as "Simulation Result 1".

If a simulation is performed that a failure occurs once for every writing and reading on and from the magnetic data of a prepaid card, the transition of a state is as follows: A cell (1, 1)→cell (1, 2)→cell (2, 4)→cell (2, 3)→cell (3, 6)→cell (3, 5) cell→(4, 7). No description of the test script file, event inputting sequence and operations of the simulator 50 based on these is not provided here, however, the accumulated time (16.5 ms) is obtained in the same manner as those described above. This is hereinafter referred to as "Simulation Result 2".

Figure 10:
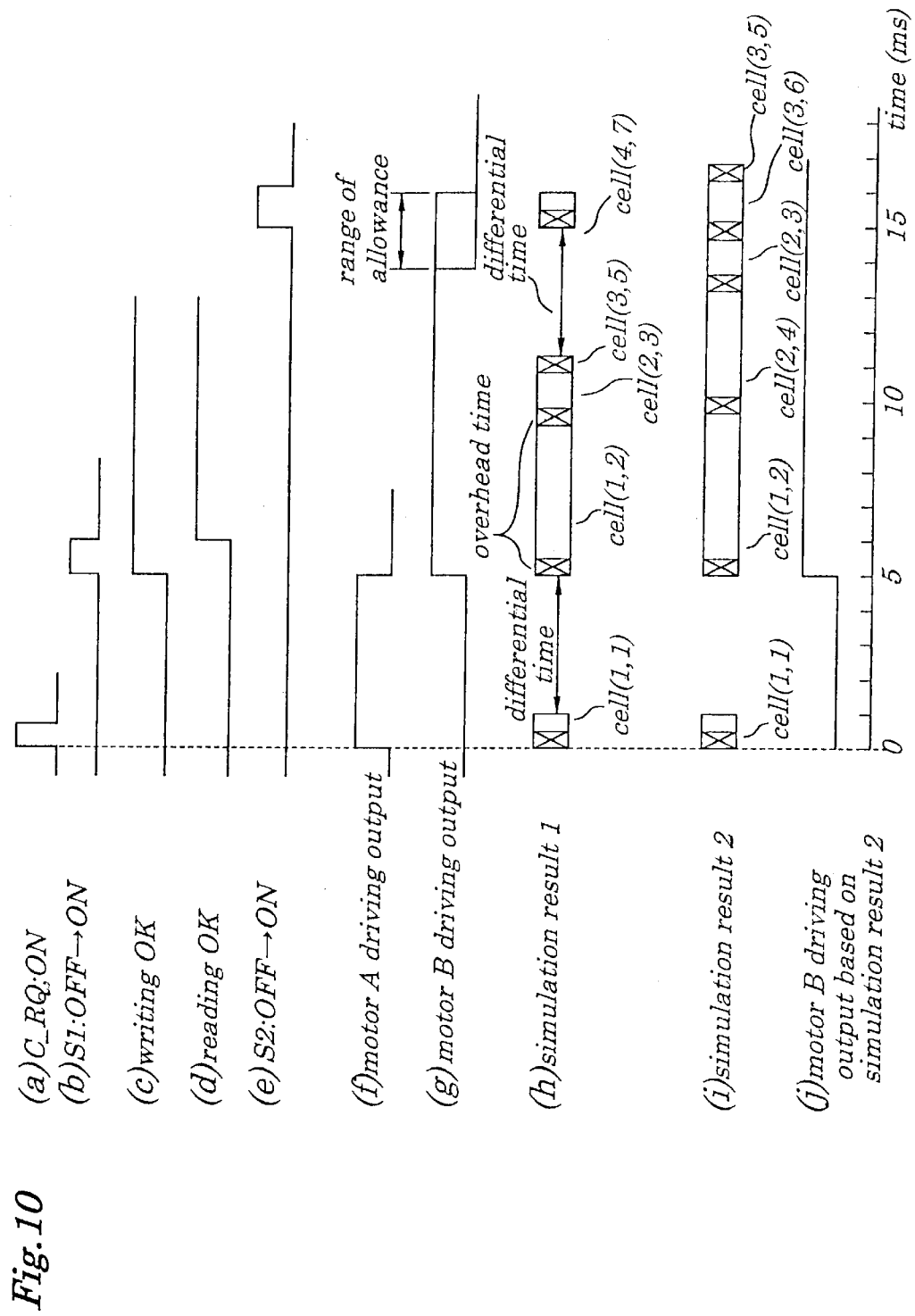
FIG. 10 shows a timing chart of one of examples of the simulation results in the second embodiment of the present invention.

Two test script files of the two simulations are stored, in advance, in the test script storing section 46. When a simulation based on these two files is complete, the state transition judging section 50b reads the simulation result stored in the simulation result storing section 51 and, after it is fed to the man-machine interface 41, the simulation is terminated. As shown in FIG. 10, this allows simulation results to be displayed, as a timing-chart, in the display section 41a of the man-machine interface 41.

FIGS. 10(a) to (e) show waveforms of simulation data on the timing of occurrences of the Event 1, Event 2, Event 3, Event 4, Event 5 and Event 7 in the state transition matrix shown in FIG. 3 and FIGS. 10(f) to (g) show waveforms of verification data on the timing of occurrence of a signal to drive the motor 35 (Motor A) and the motor 37 (Motor B). These are created from the test script file shown in FIG. 7. FIGS. 10(h) and (i) show the Simulation Result 1andSimulation Result 2 respectively, and FIG. 10(j) is a wave form showing the timing of occurrence of a signal to drive the motor 37 (Motor B). The comparison between FIG. 10(g) and FIG. 10(j) shows that, the range of allowance for timing of the ON/OFF switching of a signal to drive the motor 37 (Motors B) is between 15±1 ms in the case in FIG. 10(g), while a driving signal remains ON even after an elapse of 16 ms in the case of in FIG. 10(j), i.e., the specifications are not met in Simulation Result 2 accordingly.

Thus, an operator is allowed to repeat simulations until the specifications are met, based on the Simulation Result 2 and by referring to the state transition matrix (FIG. 3) being displayed in the display section 41a constituting the man-machine interface 41 and by manipulating the mouse 41b or the keyboard 41c, in order to reduce processing time of CPU 24 by changing actions, processing time and the like described in each cell constituting the state transition state so that they are within the range of allowance or by replacing with a CPU having more high-speed operations or to improve responsivity in the magnetic heads 34a or 34b.

Moreover, in the example described above, the step SB6 is provided and, if an event not designated in the state transition matrix is inputted, the simulator returns back to the step SB5, however, in that case, the flow chart can be so configured that the step SB6 is not provided and the simulator passes through the steps SB7 to SB13 without performing any processing.

Thus, according to the configurations of the second embodiment, because a simulation of a system can be performed based on the state transition matrix by suitably setting processing time for every action described in each cell in the state transition matrix and by taking the overhead time and differential time into consideration, a more realistic simulation, as if the system were actually operated, can be performed at the stage of basic design compared with that in the above first embodiment, thereby achieving the reduction in time required for developments and the improvement in the quality.

Third Embodiment

According to this third embodiment, an electrical configuration of a program development system is approximately the same as that of the program development system of the second embodiment shown in FIG. 6. However, functions of each constitutional factors are different as described later. A program to be developed by this program development system, as in the first embodiment, is a program to be incorporated into the prepaid card selling machine shown in FIG. 2 and specifications of the prepaid card selling machine is the same as that of the first embodiment.

In the operations of the first and second embodiments, only processing time required by the CPU 24 is taken into consideration, however, unless processing time required by peripheral devices such as magnetic heads 34a and 34b is taken into consideration, the simulation is not realistic and cannot reproduce a more really mounted state.

In this embodiment, a state transition matrix of operations of magnetic heads 34a and 34b as shown in FIG. 11 is created and a simulation is performed in relation to the simulation based on the state transition matrix shown in FIG. 3. As a method for creating the state transition matrix shown in FIG. 11 is the same as that for the state transition matrix shown in FIG. 3, the description thereof is omitted.

The "Standby state for request" shown on the most upper line in FIG. 11 represents the magnetic heads 34a and 34b are in a standby state (hereinafter as State 1) to receive a request from the CPU 24 for writing and reading magnetic data; the "Under Writing" representing that the magnetic head 34a is in a state (hereinafter as State 2) to write magnetic data to a raw card 36 and the "Under Reading" representing that the magnetic head 34b is in a state (hereinafter as State 3) to read magnetic data from the prepaid card.

The "Writing" shown on the most left line in FIG. 11 represents a state where there is a request from the CPU24 for writing specified magnetic data to the raw card 36 (hereinafter as Event 1); the "Reading" representing a state where there is a request from the CPU for reading magnetic data from a prepaid card (hereinafter as Event 2); the "Writing Completion" representing a state where a message is received informing that the magnetic head 34a has completed writing of magnetic data to the raw card 36 (hereinafter as Event 3); and the "Reading Completion" representing a state where a message is received informing that the magnetic head 34b has completed reading of magnetic data from the prepaid card (hereinafter as Event 4).

In the state transition matrix shown in FIG. 11, when a cell which is a point of intersection of an event and a state, for example, a point of intersection of the State 1 and the Event 1 is represented as a cell (1, 2), the contents of descriptions of each cell have the following meanings, i.e., the "Writing Start" in a cell (1, 1) represents a standby state (State 1) of a request from the CPU 24 for writing magnetic data showing an action of the magnetic head 34a to start writing magnetic data to the raw card 36, in response to the occurrence of the Event 1 of a request from the CPU 24 for writing magnetic data. Moreover, the "=>Under Writing" in a cell (1, 1) represents that the state subsequent to transition is the State 2 and the numeric number (1) shows that processing time required for the above action is 1 ms.

The "Writing Completion Set" in a cell (1, 1) represents that, when the magnetic head 34a completes writing of magnetic data to the raw card 36, a message is sent informing that the writing is complete.

The "Reading Start" in a cell (1, 2) represents a standby state (State 1) of a request from the CPU 24 for reading magnetic data showing an action of the magnetic head 34b to start reading magnetic data to the raw card 36, in response to the occurrence of the Event 1 of a request from the CPU 24 for reading magnetic data. The "=>Under Reading" in a cell (1, 2) represents that the state subsequent to transition is the State 3 and the numeric number (1) shows that processing time required for the above action is 1 ms. The "Reading Completion Set" in a cell (1, 2) represents that, when the magnetic head 34b completes reading of magnetic data from the raw card 36, a message is sent informing that the reading is complete.

The mark (X) represents that there is no combined state of the event and the state in cells (1, 3) and (1, 4).

The "Error Return" in a cell (2, 1) represents a state (State 2) where the magnetic head 34a is writing magnetic data to the raw card 36 and a request (Event 1) for writing magnetic data occurs from the CPU 24, showing an action to inform the CPU that only one raw card 36 can be written in one operation according to the specification. The mark "=>–" in a cell (2, 1) represents that operations remain in a present state, i.e., in the State 2, and the numeric number (0.5) shows that processing time required for the above action is 0.5 ms.

The "Error Return" in a cell (2, 2) represents an action to judge that an abnormality has occurred if an request for reading magnetic data is supplied from the CPU 24 regardless of the state (State 2) where the magnetic head 34a is writing magnetic data to the raw card 36 and to inform the CPU of it. The mark "=>–" in a cell (2, 2) represents that operations remain in a present state, i.e., in the State 2, and the numeric number (0.5) shows that processing time required for the above action is 0.5 ms.

The "Data Flag Set: Writing Completion" in a cell (2, 3) represents a state (State 2) where the magnetic head 34a is writing magnetic data to the raw card 36 and shows an action to set a data flag that the writing is complete, in response to the Event that a message is received informing that the magnetic head 34a has completed writing of magnetic data to the raw card 36. Moreover, the "Standby State for Request" in a cell (2, 3) represents that the state subsequent to transition is the State 1 and the numeric number (1) shows that processing time required for the above action is 1 ms.

In a cell (2, 4), the mark "/" represents that no action is implemented and no transition of a state takes place therein. The meaning of the mark "/" is the same as in a cell (3, 3) and accordingly the description thereof is omitted.

The "Error Return" in a cell (3, 1) represents an action to judge that an abnormality has occurred if an request (Event 1) for writing magnetic data is supplied from the CPU 24 regardless of the state (State 3) where the magnetic head 34a is reading magnetic data from the prepaid card and to inform the CPU of it. The mark "=>–" in a cell (3, 1) represents that operations remain in a present state, i.e., in the State 3, and. the numeric number (0.5) shows that processing time required for the above action is 0.5 ms.

The "Error Return" in a cell (3, 2) represents a state (State 3) where the magnetic head 34b is reading magnetic data from the prepaid card and a request (Event 2) for reading magnetic data is given by the CPU 24, showing an action to inform the CPU that only one prepaid card can be written in one operation according to the specification. The mark "=>–" in a cell (2, 2) represents that operations remain in a present state, i.e., in the State 3, and the numeric number (0.5) shows that processing time required for the above action is 0.5 ms.

The "Data Flag Set: Reading Completion" in a cell (3, 4) represents a state (State 3) where the magnetic head 34b is reading magnetic data from the prepaid card and shows an action to set a data flag that the reading is complete, in response to the event (Event 4) that a message is received informing that the magnetic head 34ba has completed reading of magnetic data from the prepaid card. Moreover, the "Standby State for Request" in a cell (3, 4) represents that the state subsequent to transition is the State 1 and the numeric number (1) shows that processing time required for the above action is 1 ms.

Then, an operator inputs simulation data and verification data by referring to an indication on the display section 41a constituting the man-machine interface 41c and by manipulating the mouse 41b or the keyboard 41c, in order to have the simulator 50 perform a simulation based on the above two state transition matrixes (FIGS. 3 and 11) according to specifications of the prepaid card selling machine. The contents of the simulation data and verification data are the same as those in the above second embodiment and, accordingly, the description thereof is omitted.

Figures 13, 14:
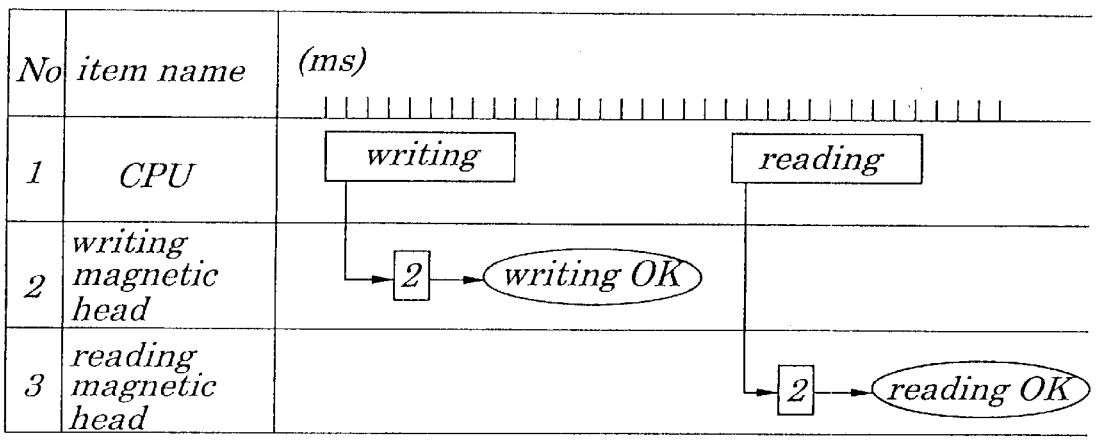
FIG. 13 shows one of examples of the test script file in a timing chart format to be used for the simulation in the third embodiment.
FIG. 14 illustrates one of examples of configurations of an overhead storing section of the third embodiment.

The editor 42 creates and edits a test script file of a timing chart format shown in FIGS. 12 and 13, based on the simulation data and the verification data and stores it to a test script storing section 46. In FIG. 12, the numbers 1 (No. 1) and 2 (No. 2) in the table show the simulation data while the numbers 3 (No. 3) and 4 (No. 4) show the verification data. In the verification data shown as No. 4 in FIG. 12, the numeric value "±1" enclosed by a square represents that the timing for switching control from the ON state to the OFF state of the motor B, i.e., the motor 37 has to be within allowable range of ±1 ms. In the No. 1 column of the table in FIG. 13, the "Writing" enclosed by a square shows that an instruction for writing magnetic data is provided by the CPU to a writing magnetic head, i.e., the magnetic head 34a while the "Reading" enclosed by a square shows that an instruction for reading magnetic data is provided by the CPU to a reading magnetic head, i.e., the magnetic head 34b. Furthermore, the content in the No. 2 column in FIG. 13 shows that, 2 ms after an instruction for writing is received from CPU, a notice "Writing OK" showing the normal completion of writing of magnetic data is supplied to the CPU, causing an interruption to occur in the CPU. Similarly, the content in the No. 3 column in FIG. 13 shows that, 2 ms after an instruction for reading is received from a CPU, a notice "Reading OK" showing the normal completion of reading of magnetic data is supplied to the CPU, causing an interruption to occur in the CPU. The above time "2 ms" is not absolute time but relative time in either case.

Moreover, the test script file in a timing chart format can be created by using, for example, a timing chart editing program incorporated into the editor 42 or it can be converted or created by using the timing chart editing program incorporated into the editor 42 after the completion of creating a test script file in a text format shown in FIG. 7. The latter method is employed in this embodiment. Accordingly, the test script file in a text format and the test script file in a timing chart format are created and stored in the test script storing section 46.

In the operation of the second embodiment, though the overhead time is set uniformly to be 0.5 ms, to be exact, the overhead time differs depending upon each cell in the state transition matrix or varies before and after the implementation of an action. Accordingly, in operations of the present invention, in order to perform a more realistic simulation, as shown in FIG. 14, a storage area corresponding to the state transition matrix shown in FIG. 3 is provided in the overhead time storing section 45 to store the over head time. In numeric numbers "0.2/0.3" in FIG. 14, for example, the numeric number "0.2" put before the mark "/" represents the overhead time (before-overhead time) required before the execution of the action described in the cell while the numeric number "0.3" put after the mark "/" represents the overhead time (after-overhead time) required after the execution of the action described in the cell. Moreover, since the magnetic heads 34a and 34b are driven by a specialized LSI adapted to receive a control signal from the CPU 24, to be exact, the overhead time must be taken into consideration. However, in this embodiment, both the before-overhead time and the after-overhead time in relation to the driving of the magnetic heads 34a and 34b are handled as being not present.

Then, in order to have the simulator 50 perform a simulation based on the above two state transition matrixes (FIGS., 3 and 11), according to specifications of the above prepaid card selling machine, when an operator, by manipulating the mouse 41b and the keyboard 41c constituting the man-machine interface 41, puts this program development system in the simulation mode, the simulation mode window provided with an "START" area where an instruction for a start of simulation is provided appears.

The operations of the simulator 50 and the manipulation of the operator performed when the processing time required by the CPU 24 until the passage of the raw card 36 through the sensor 33 after its passage through the sensor 32 is obtained will be described with reference to a flow chart shown in FIG. 15.

The operator provides an instruction for a start of the simulation by moving a cursor using a cursor key of the mouse 11b and the keyboard 11c to the "START" area, where the start of the simulation is instructed, displayed on the simulation mode window and by clicking the left button of the mouse or pressing down the return key. This allows the state transition judging section 50b to go to step SC1 and, after clearing the stored content of the time accumulating section 50c to 0 ms, it goes to step SC2. At step SC2, the state transition judging section 50b, after reading the heading statement of the test script file in a text format supplied from the event inputting section 49 and setting it as an initial state to the state storing section 18d, goes to step SC3. In this example, since the "InitialState:ST1" is described as a heading statement in the test script file shown in FIG. 7, the State 1 is set as an initial state in the state storing section 50d. At step SC3, the state transition judging section 50b judges whether the test script file in a timing-chart form to be inputted to the event analysis section 50a from the event inputting section 49 is present or not. If the judgement result is YES at step SC3, i.e., the test script file in a timing-chart format to be inputted to the analysis section 50a from the event inputting section 49 is present, the state transition judging section 50b, after inputting the test script file to the event analysis section 50a from the event inputting section 49, goes to step SC4. In the example, as the test script file shown in FIGS. 12 and 13 is stored in the test script storing section 46, the judgement result is YES at step SC3, and the state transition judging section 50b inputs the test script file into the event analysis section 50a from the event inputting section 49.

At step SC4, the state analysis section 50a, after detecting a point of a change of a wave form of each event in the test script file in a timing-chart format inputted from the event inputting section 49, creating the event inputting sequence where the events are re-arranged in order of time of the occurrence and feeding to the state transition judging section 50b, goes to step SC5. In the example, the event inputting sequence (not shown) of a timing-chart format is created from the test script file in the timing-chart format shown in FIGS. 12 and 13.

At step SC5, the state transition judging section 50b reads the event inputting sequence from the event analysis section 50a in order of an earlier time and judges whether the event to be brought about is present. If the judgement result is YES, the state transition judging section 50b captures the event to be brought about most earliest out of the events to be brought about and goes to step SC6.

On the other hand, if the judgement result is NO at step SC5, i.e., if the scanning of the event inputting sequence in order of an earlier time reveals that the event that has not yet occurred is not present, the state transition judging section 50b judges that the simulation based on one test script file is complete, returns back to step SC3 and judges whether the test script file to be tested is present or not. In the example, as the simulation based on the test script file shown in FIGS. 12 and 13 is the first one and not be complete and there remains an event to occur in the event inputting sequence read from the event analysis section 50a, the judgement result becomes "YES" and the state transition judging section 50b captures "S1:OFF→ON" and goes to SC6.

At step SC6, the state transition judging section 50b, by referring to the state transition matrix read from the state transition matrix storing section 13, judges whether the captured event is an object to be simulated. If the judgement result is NO, the state transition judging section 50b returns back to step SC5. On the other hand, if the judgement result at step SC6 is YES, i.e., if the captured event is an event described in the state transition matrix and is an object to be simulated, the operation goes to step SC7. In the example, the event "S1:OFF→ON" is described as the State 2 in the state transition matrix shown in FIG. 3 and is an object to be simulated, the judgement result at step SC6 becomes YES.

At step SC7, the time comparison section 50e compares the time at a point of the change of a wave form of the event captured by the state transition judging section 50b with the accumulated time being stored in the time accumulating section 50c and judges whether there is a difference between them, i.e., whether there is a differential time. If the judgement result is NO, the time comparison section 50e goes to step SC9. If the judgement result at step SC7 is YES, i.e., there is a differential time, the operation goes to step SC8. In the example, since the Event 2 is the event that the detection signal of the sensor 32 is changed from the OFF to ON state and it is not related to an instruction used by the CPU to have peripheral devices to perform processing, no differential time is present and the judgement result at step SC7 becomes NO, and the time comparison section 50e goes to step SC9 accordingly.

At step SC8, the time comparison section 50e adds the differential time to the accumulated time now being stored in the time accumulating section 50c or subtracts it from the accumulated time and, after storing the calculated result into the time accumulating section 50c, the operation goes to step SC9.

At step SC9, the state transition judging section 50b decides a corresponding cell based on the event captured from the event analysis section 50a and the state being stored in the state storing section 18d and by referring to the state transition matrix read from the state transition matrix storing section 13 and goes to step SC10. In the example, since the Event 2 has been captured from the event analysis section 50a and the State 1 is stored in the state storing section 50d, the state transition judging section 50b decides a cell (1, 2) by referring to the state transition matrix.

At step SC10, the state transition judging section 50b, after reading the before-overhead time from the storing area of the overhead time storing section 45 corresponding to the cell decided at the step SC9, adding it to the accumulated time being stored in the time accumulating section 50c and storing the calculated result into the time accumulating section 50c, goes to step SC11. However, if the cell decided by processing at step SC9 is the cell in the state transition matrix shown in FIG. 11, the state transition judging section 50b, without executing anything, goes to step SC11. In the example, the state transition judging section 50b, after reading the before-overhead time (0.2 ms) from the storing area of the overhead time storing section 45 corresponding to a cell (1, 2) and adding it to the accumulated time (0 ms) stored so far in the time accumulating section 50c, stores the added time (0.2 ms) into the time accumulating section 50c.

At step SC11, the state transition judging section 50b checks the function of an action to be processed at a cell decided at step SC9, reads the processing time corresponding to the action from the processing time storing section 44, adds it to the accumulated time stored so far in the time accumulating section 50c, stores the calculated result into the time accumulating section 50c, and goes to step SC12. In the example, the state transition judging section 50b checks the function of actions of requests for stopping the driving of the motor 35, driving of the motor 37 and writing of magnetic data to the magnetic head, reads the processing time (4 ms) corresponding to the action from the processing time storing section 44, adds it to the accumulated time (0.2 ms) stored so far in the time accumulating section 50c, and stores the calculated result (4.2 ms) to the time accumulating section 50c.

At step SC12, the state transition judging section 50b reads the state subsequent to transition described in a cell decided at step SC9 from the state transition matrix storing section 43, stores it to the state storing section 50d, and if the action of the cell is a control of peripheral devices, after storing the state in the state transition matrix of operations of peripheral devices corresponding to the action into the state storing section 50d as well, and goes to step SC13. In the example, the state transition judging section 50 reads the State 2 described at a cell (1, 2) from the state transition matrix storing section 43, stores it into the state storing section 50d and, after causing the Event 1, i.e., the request for writing to occur because an action of the cell is a request for writing magnetic data to the magnetic head 34a, and stores the State into the state storing section 50d.

At step SC13, the state transition judging section 50b reads the after-overhead time from the storing area in the overhead time storing section 45 corresponding to the cell decided at step SC9, adds it to the accumulated time stored in the time accumulating section 50c, stores the calculated results into the time accumulating section 50c and goes to step SC14. However, if a cell decided at step SC9 is the cell in the state transition matrix shown in FIG. 11, no overhead time is present and, accordingly, the state transition judging section 50b goes to step SC14 without performing anything.

In the example, the state transition judging section 50b, after reading the after-overhead time (0.3 ms) from the storing area of the overhead time storing section 45 corresponding to a cell (1, 2) and adding it to the accumulated time (4.2 ms) stored so far in the time accumulating section 50c, stores its result (5.4 ms) of the addition into the time accumulating section 50c.

At step SC14, the state transition judging 50c, after storing the time accumulated in the time accumulating section 50c and the state subsequent to transition stored in the state storing section 50d, as the result of simulation, into the simulation result storing section 51, goes back to step SC5.

In the example, the accumulated time (4.5 ms) and the state subsequent to transition (State 2 and State 1), as the result of simulation, is stored in the simulation result storing section 51.

On the other hand, if the judgement result at step SC3 is NO, i.e., if the test script file to be continued is not inputted from the event inputting section 49 to the event analysis section 50a, the state transition judging section 50b judges that the simulation based on all the test script file stored in the test script storing section 46 is completed and goes to step SC15.

At step SC15, the state transition judging section 50b, after reading the simulation result stored in the simulation result storing section 51 and supplying it to the man-machine interface 41, terminates the simulation processing. This causes the result of simulation to be displayed on the display section 41a of the man-machine interface 41.

An event to be brought about at an earlier time next to the event "S1: OFF→ON", an event to be brought about thereafter and a simulation to be correspond are described below.

Figure 15:
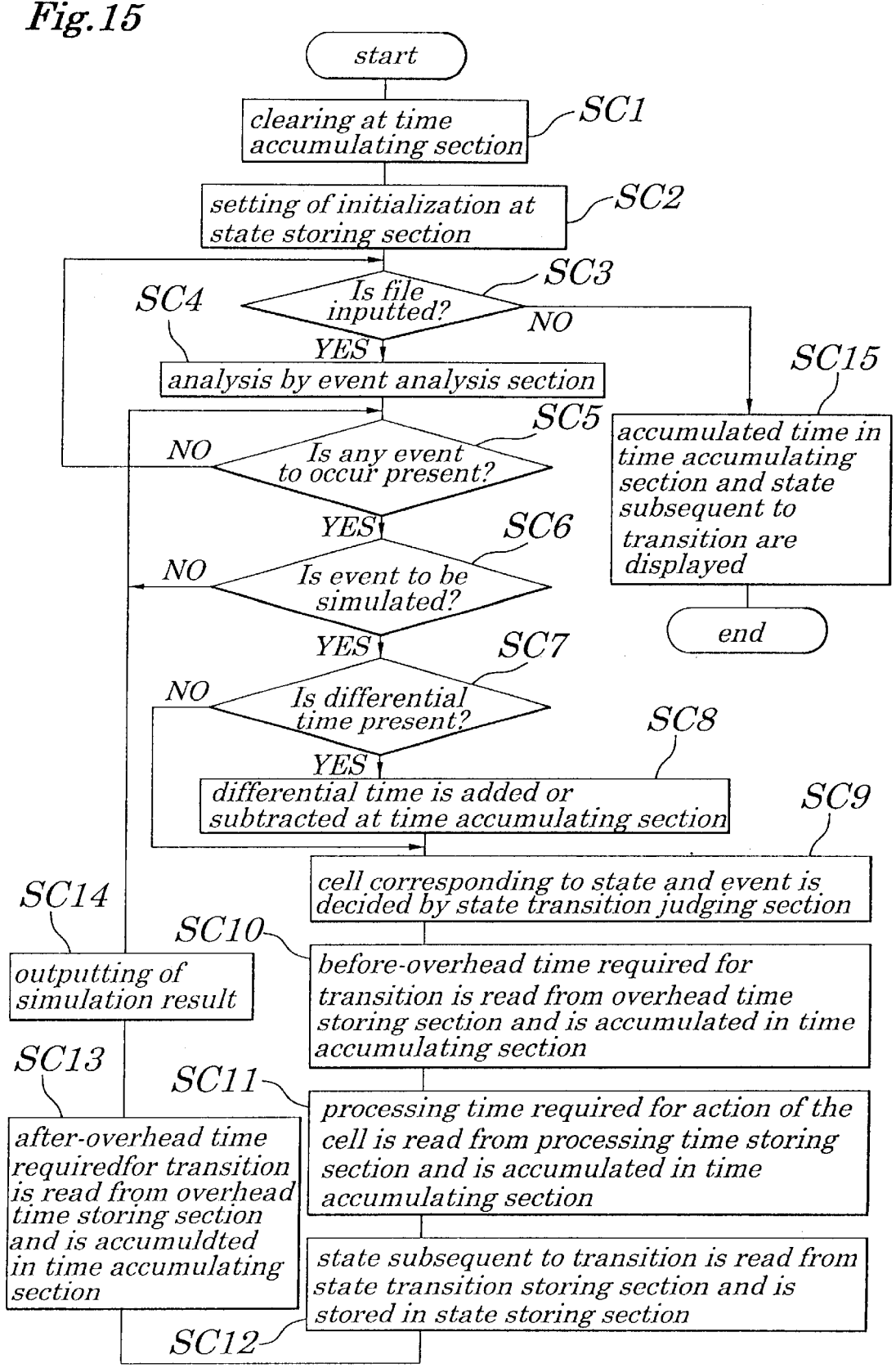
FIG. 15 shows a flow chart showing operations of a simulator of the same embodiment.

Though the processing at each step in the flowchart shown in FIG. 15 is not described, it is not necessary to perform the processing at step SC15 at the end after the processing at steps SC3~SC14 is repeated.

The state transition judging section 59b captures the event "Writing" by referring to the event inputting sequence.

Since the event "Writing" is described in the state transition matrix shown in FIG. 11 and is an object to be simulated, the time comparison section 50e compares the time at a point of change of a waveform in the Event 1 with the accumulated time (4.5 ms) stored in the time accumulating section 50c and judges whether there is a difference between them, i.e., differential time. In the example, as the accumulated time (4.5 ms) is the time recorded when all the actions described in a cell (1, 2) are complete and, as shown in FIG. 13, the Event 1 in FIG. 11 is an event which occurs immediately after a request from the CPU 24 for writing of magnetic data to the magnetic head 34a, the time at a point of change of a waveform in the Event 1 is earlier by the after-overhead time (0.3 ms) following the execution of the action described in the cell (1, 2). The time 0.3 ms is a differential time accordingly. Then, the time comparison section 50e, after subtracting the differential time (0.3 ms) from the accumulated time (4.5 ms), stores the result (4.2 ms) into the time accumulating section 50c.

The event analysis section 50a, after deciding a cell (1, 1) based on the "Event 1" captured from the event analysis section 50a and the "State 1" stored in the state storing section 18 and by referring to the state transfer matrix shown in FIG. 11, checks the function of an action, which is processed at a cell (1, 1), to cause the magnetic head 34a to start writing of magnetic data to the raw card 36, reads the processing time (1 ms) from the processing storing section 44, adds it to the accumulated time (4.2 ms) stored so far in the time accumulating section 50c and stores the result (5.2 ms) of addition into the time accumulating section 50c.

The state transition judging section 50b, after reading the state subsequent to transition (State 2) described in a cell (1, 1) from the state transition matrix storing section 43 and storing it into the state storing section 50d, stores the accumulated time (5.2 ms) stored in the time accumulating section 50*c* and the state subsequent to transition (State 2) stored in the state storing section 50*d*, as the result of simulation, into the simulation result storing section 51.

The state transition judging section 50*b* captures the event "Writing Completion" by referring to the event inputting sequence.

Because the event "Writing Completion" is described as the Event 3 in the state transition matrix and is an object to be simulated, the time comparison section 50*e*, by comparing the time at a point of change of a waveform in the Event 3 with the accumulated time (5.2 ms) stored in the time accumulating section 50*c*, judges whether there is a differential time or not, however, in this example, as the simulation of the magnetic head 34*a* and 34*b* is performed, no differential time exists.

The state transition judging section 50*b*, after deciding a cell (2, 3) based on the Event 3 captured from the event analysis section 50*a* and on the state (State 2) stored in the state storing section 18*d* and by referring to the state transition matrix shown in FIG. 11, checks the function of an action to set a data flag informing that the writing is complete, which is processed in a cell (2, 3), reads the processing time (1 ms) from the processing time storing section 44, adds it to the accumulated time (5.2 ms) stored in the time accumulating section 50*c* and stores the result of addition (6.2 ms) into the time accumulating section 50*c*.

The state transition judging section 50*b*, reads the state subsequent to transition described in a cell (2, 3) from the state transition storing section 43 and stores it into the state storing section 50*d* and, as the action of the cell is a data flag set informing that the writing is complete, after bringing about a interruption request for the Event 3, "Writing OK", it stores the accumulated time (6.2 ms) accumulated in the time accumulating section 50*c* and the state subsequent to transition (State 1) stored in the state storing section 50*d*, as the result of simulation, into the simulation result storing section 51.

Then, the state transition judging section 50*b* captures the event "Writing OK" by referring to the event inputting sequence. Though the event "Writing OK" is described as the Event 3 in the state transition matrix in FIG. 3 and is an object to be simulated, as it is an event occurring subsequent to the previous processing, no differential time exist. The state transition judging section 50*b* decides a cell (2, 3) based on the Event 3 captured from the event analysis section 50*a* and the state subsequent to transition (State 2) stored in the state storing section 18*d* and by referring to the state transition matrix in FIG. 3 and, after reading the before-overhead time from the storing area of the overhead time storing section 45 corresponding to a cell (2, 3) and adding it to the accumulated time (6.2 ms) stored so far in the time accumulating section 50*c*, stores the result of addition (6.4 ms) into the time accumulating section 50*c*.

Moreover, the state transition judging section 50*b*, checks the function of the action of requesting the magnetic head 34*b* to read magnetic data of the prepaid card, which is processed at a cell (2, 3), reads the processing time (1 ms) from the processing time storing section 44, adds it to the accumulated time (6.4 ms) stored so far in the time accumulating section 50*c* and stores the result of addition into the time accumulating section 50. Then, the state transition judging section 50*b*, after reading the State 3 described in a cell (2, 3) from the state transition storing section 43 and storing it into the state storing section 50*d*; as the action of the cell is to request the magnetic head 34*b* to read the magnetic data, after bringing about the Event 2, i.e., a request for reading, reads the after-overhead time (0.2 ms) from the storing area of the overhead time storing section 45 corresponding to a cell (2, 3), adds it to the accumulated time (7.4 ms) stored so far in the time accumulating section 50*c*, and stores the result of addition (7.6 ms) into the time accumulating section 50*c*.

The state transition judging section 50*b* captures the event "Reading" by referring to the event inputting sequence. Because this event "Reading" is described as the Event 2 in the state transition matrix shown in FIG. 11 and is an object to be simulated, the time comparison section 50*e* compares the time at a point of changes in the waveform in the Event 2 with the accumulated time (7.6 ms) stored in the time accumulating section 50*c* and judges whether the differential time exists or not. In the example, the accumulated time (7.6 ms) is the time recorded when all the actions described in a cell (2, 3) in FIG. 3 are complete and, while, as shown in FIG. 13, the Event 2 in FIG. 11 is an event which occurs immediately after a request from the CPU 24 for reading of magnetic data to the magnetic head 34*b*, the time at a point of changes of the waveform in the Event 2 is earlier by the after-overhead time (0.2 ms) following the execution of the action described in the cell (2, 3). The time 0.2 ms is a differential time accordingly. Then, the time comparison section 50*e* subtracts the differential time (0.2 ms) from the accumulated time (7.6 ms) being currently stored in the time accumulating section 50*c* and stores the result of subtraction (7.4 ms) into the time accumulating section 50*c*.

The state transition judging section 50*b*, after deciding a cell (1, 2) based on the Event 2 captured from the event analysis section 50*a* and on the state (State 1) stored in the state storing section 18*d* and by referring to the state transition matrix shown in FIG. 11, checks the function of an action to cause the magnetic head 34*b* to start reading of magnetic data from the prepaid card, which is processed in a cell (1, 2), reads the processing time (1 ms) from the processing time storing section 44, adds it to the accumulated time (7.4 ms) stored in the time accumulating section 50*c* and stores the result of addition (8.4 ms) into the time accumulating section 50*c*.

The state transition judging section 50*b*, after reading the state subsequent to transition (State 3) described in a cell (1, 2) from the state transition matrix storing section 43 and storing it into the state storing section 50*d*, stores the accumulated time (8.4 ms) stored in the time accumulating section 50*c* and the state subsequent to transition (State 3), as the result of simulation, into the simulation result storing section 51.

The state transition judging section 50*b* captures the event "Reading Completion" by referring to the event inputting sequence.

Since the event"Reading Completion" is described in the state transition matrix shown in FIG. 11 and is an object to be simulated, the time comparison section 50*e* compares the time at a point of changes of the waveform in the Event 4 with the accumulated time (8.4 ms) stored in the time accumulating section 50*c* and judges whether there is a difference between them, i.e., differential time. In the example, as the simulation of the magnetic head 34*a* and 34*b* is performed, no differential time exist.

The state transition judging section 50*b*, after deciding a cell (3, 4) based on the Event 4 captured from the event analysis section 50*a* and on the state (State 3) stored in the state storing section 18*d* and by referring to the state transition matrix shown in FIG. 11, checks the function of an action to set a data flag informing that the reading is complete, which is processed in a cell (3, 4), reads the processing time (1 ms) from the processing time storing section 44, adds it to the accumulated time (8.4 ms) stored in the time accumulating section 50c and stores the result of addition (9.4 ms) into the time accumulating section 50c.

The state transition judging section 50b reads the state subsequent to transition described in a cell (3, 4) from the state transition matrix storing section 43 and stores it into the state storing section 50d, and after bringing about a request for the Event 5, i.e., Reading OK because the action of the cell is a data flag set informing of the completion of reading, stores the accumulated time (9.4 ms) stored in the time accumulating section 50c and the state (State 1) subsequent to transition stored in the state storing section 50d as the result of simulation into the simulation result storing section 51.

The state transition judging section 50b captures the event "Reading OK" by referring to the event inputting sequence. Though the event "Reading OK" is described as the Event 5 in the state transition matrix shown in FIG. 3 and an object to be simulated, as the event is one following the previous processing, no differential time exist.

The state transition judging section 50b, after deciding a cell (3, 5) based on the Event 5 captured from the event analysis section 50a and on the state (State 3) stored in the state storing section 18d and by referring to the state transition matrix shown in FIG. 11, and after reading the before-overhead time (0.2 ms) from the storing area of the overhead time storing section 45 corresponding to a cell (3, 5) and adding it to the accumulated time (8.4 ms) stored so far in the time accumulating section 50c, stores the result of addition (9.6 ms) into the time accumulating section 50c.

Then, the state transition judging section 50b reads the State 4 described in a cell (3, 5) from the state transition matrix storing section 43 and stores it to the state storing section 50d, and, after reading the after-overhead time (0.3 ms) from the storing area of the overhead time storing section 45 corresponding to a cell (3, 5) and adding it to the accumulated time (9.6 ms) stored so far in the time accumulating section 50c, stores the result of addition (9.9 ms) to the time accumulating section 50c.

Figure 16:
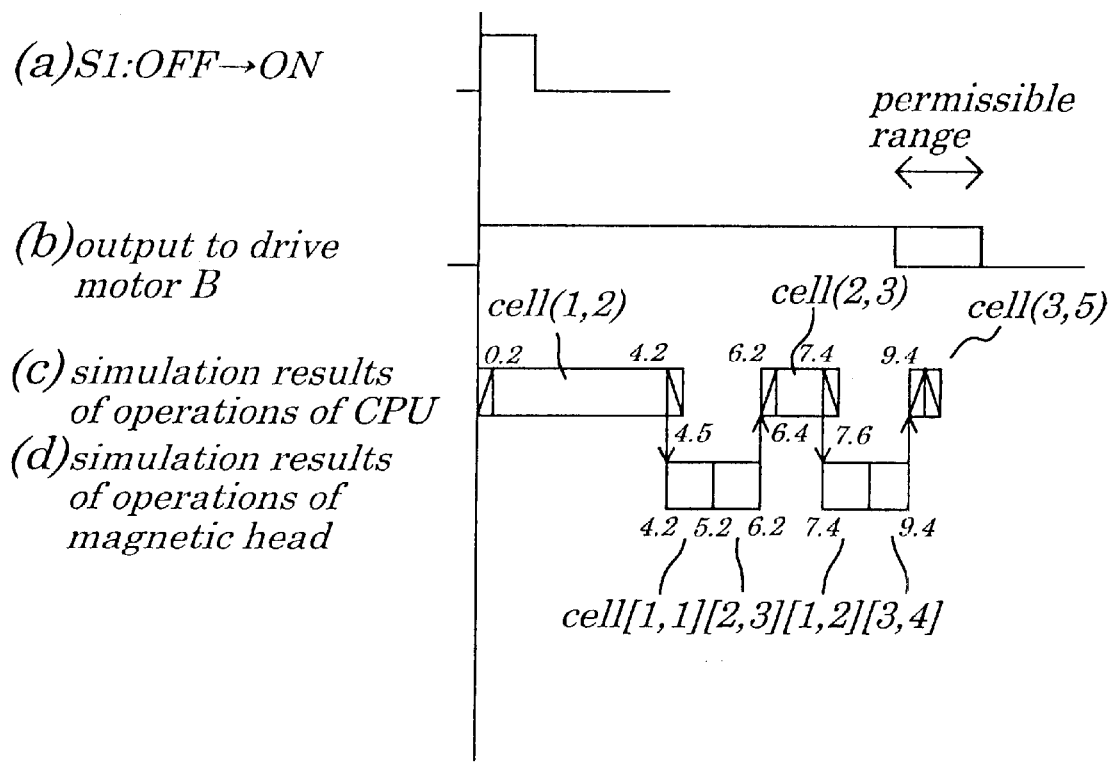
FIG. 16 shows a timing chart showing one of examples of simulation results in the same embodiment.

After the simulation described above is complete, the state transition judging section 50b reads the simulation result stored in the simulation result storing section 51, feeds it to the man-machine interface 41, and then terminates the simulation processing. As depicted in FIG. 16, this causes the simulation results that have been obtained so far to be displayed on the display section 41a of the man-machine interface 41.

FIG. 16(a) shows a waveform of simulation data on the timing of occurrence of the Event 2 shown in the state transition matrix in FIG. 3 and FIG. 16(b) illustrates a waveform of the verification data on the timing of occurrence of a driving signal to drive the motor 37 (Motor B). Moreover, FIGS. 16(c) and (d) show simulation results of operations of each CPU and of operations of the magnetic head respectively. As shown in FIG. 16(b), a permissible range in the timing of a change of a driving signal of the motor 37 (Motor B) from the ON to OFF state is 10±1 ms; however, the simulation result of operations of the CPU associated with the magnetic head shows that all the processing is complete within 9.9 ms, thus specifications are met.

On the other hand, if the simulation is not performed to specifications, an operator, by referring to the state transition matrix (FIG. 3 and FIG. 11) displayed in the display section 41a constituting the man-machine interface 41 and by manipulating the mouse 41b or the keyboard 41c, further by changing the action or the processing time and the like described in each cell constituting the state transition matrix within the permissible range of the specification, tries to find out a way to reduce the processing time of the CPU 24, to replace the CPU with a new one having higher-speed operation capability and to improve responsivity of the magnetic head 34a or 34b and repeats simulations until specifications are met.

In operations of the embodiment described above, the step SC6 is provided and, if an event not designated in the state transition matrix is inputted, the operation returns back to the step SC5; however, the flowchart may be so configured that the processing at steps SC7 to SC14 is omitted without providing the step SC6.

In operations of this embodiment, since the simulation can be performed by creating the state transition matrix not only for operations of the CPU but also for operations of the peripheral devices and by combining these factors together, a more realistic simulation is made possible at the step of the basic design, thus reducing a period of time required for development and improving the quality simultaneously.

Fourth Embodiment

Figure 17:
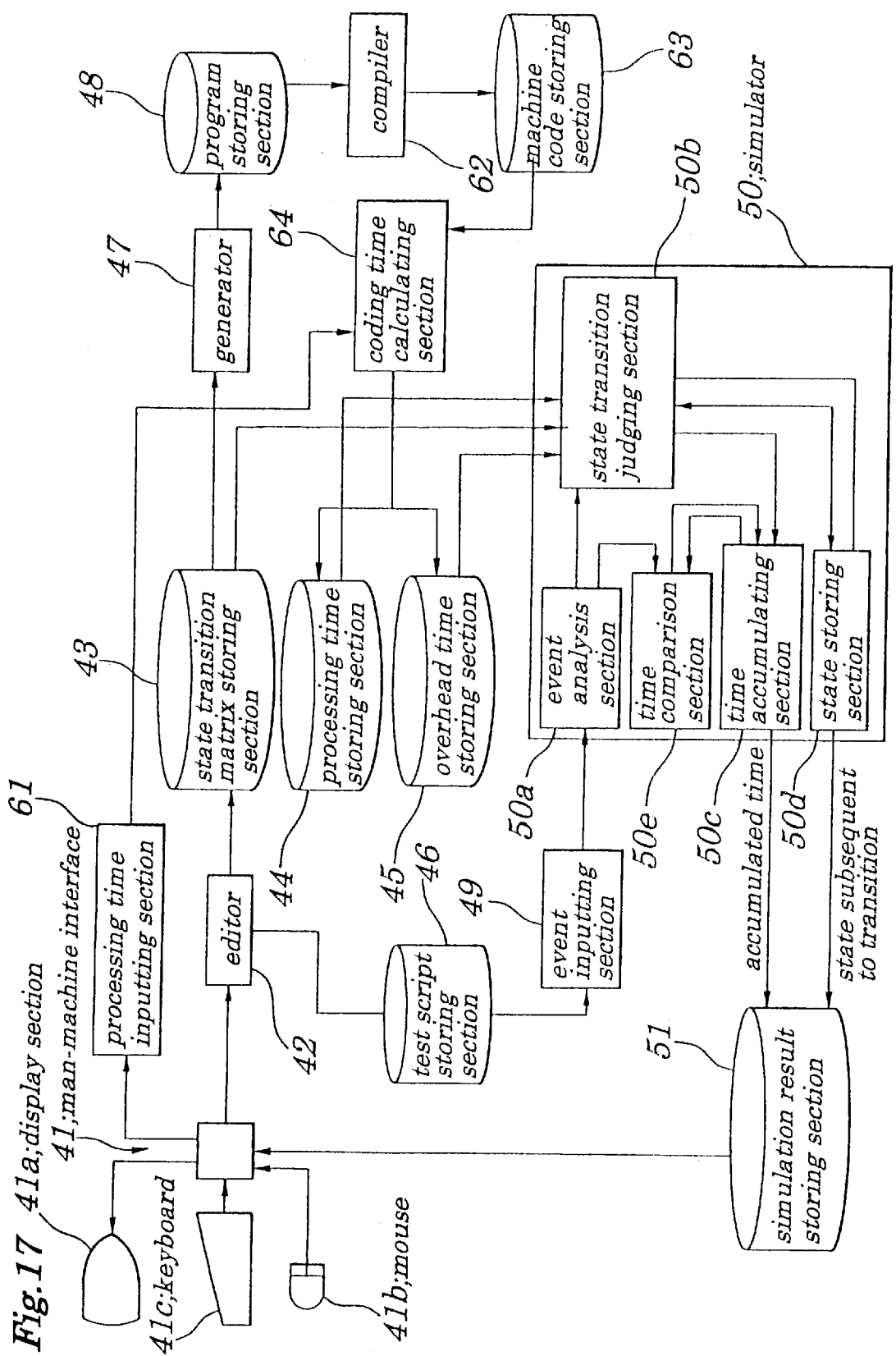
FIG. 17 is a block diagram showing an electrical configuration of the program development system of a fourth embodiment of the present invention.

FIG. 17 is a block diagram showing an electrical configurations of the program development system of a fourth embodiment of the present invention. In FIG. 17, the same reference number is assigned to the part corresponding to that in FIG. 6 and their description is omitted. The program development system shown in the drawing is newly provided with a processing time inputting section 61, a compiler 62, a machine code storing section 63 and coding time calculating section 64. The processing time inputting section 61 is adapted to store temporarily an operational speed required by the CPU constituting a real time control system for which a program is developed, which is inputted by an operator by manipulating the mouse 41b and keyboard 41c constituting the man-machine interface 41. The compiler 62 reads a program (source program) stored in the program storing section 48, converts the program to an object program written in a machine code being able to be handled by the CPU and stores it to the machine code storing section 63. The machine code storing section 63 is composed of semiconductor memory such as RAM and/or a storing medium having a large-scale memory capacity such as FD, HD and the like. The coding time calculating section 64 is adapted to multiply an operational speed of the CPU stored in the processing time inputting section 61 by the number of codes of the machine code constituting the object program corresponding to the action described in each cell in the state transition matrix and stores the multiplied result, as processing time required for the action, in the storing area corresponding to the processing time storing section 44. Moreover, the coding time calculating section 64 is adapted to multiply an operational speed of the CPU stored in the processing time inputting section 61 by the number of codes of the machine code constituting the object program corresponding to the transition of a state before and after the processing of the action described in each cell in the state transition matrix and stores the multiplied result, as overhead time in the transition of a state, in the storing area corresponding to the overhead time storing section 45.

The simulation according to embodiment is made more accurate than that based on values of processing time or overhead time obtained from experiences as in the second to third embodiments and even a less-experienced operator can perform the same accurate simulation as achieved by an experienced operator.

Fifth Embodiment

Figure 18:
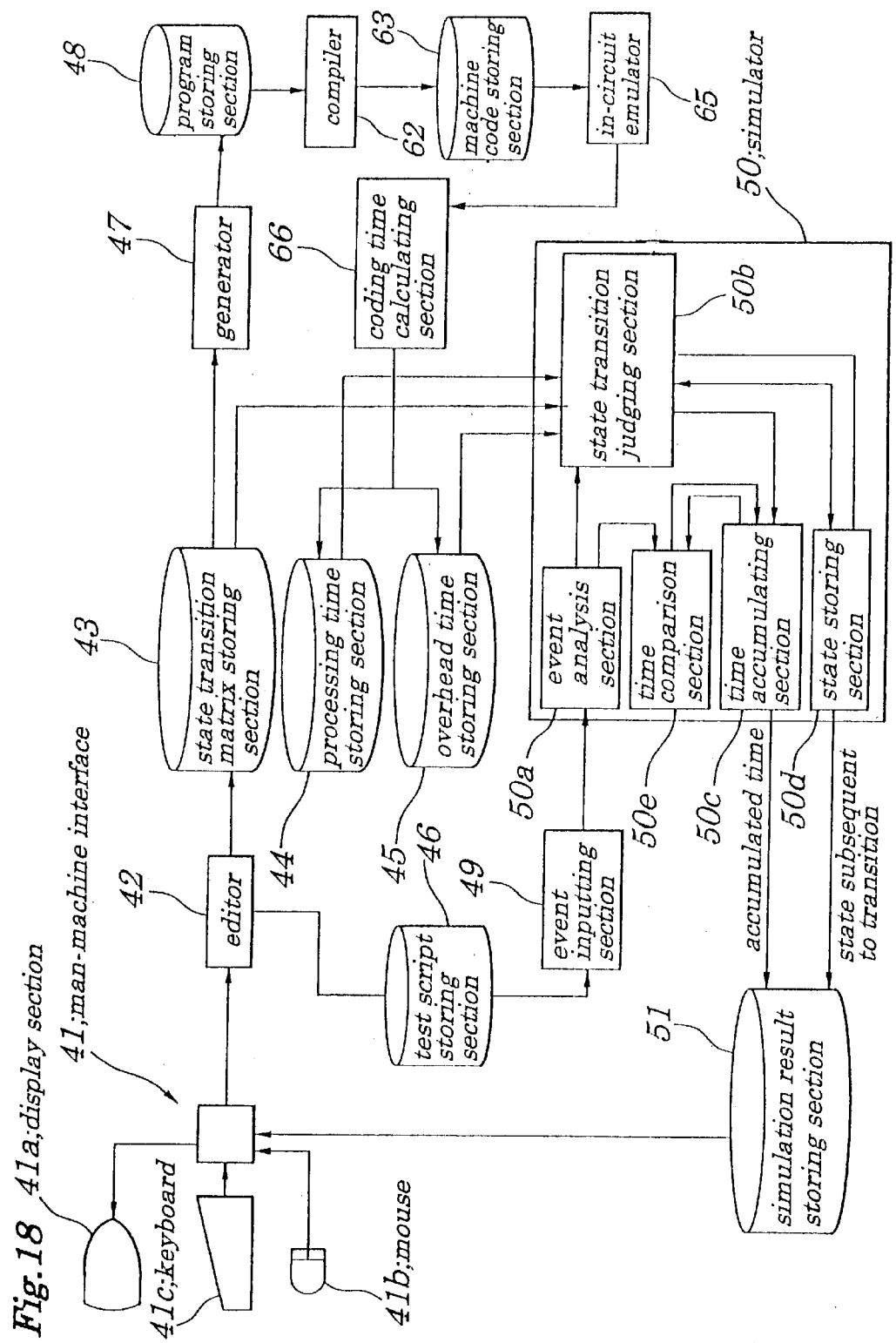
FIG. 18 is a block diagram showing an electrical configuration of the program development system of a fifth embodiment of the present invention.

FIG. 18 is a block diagram showing an electrical configurations of the program development system of a fifth embodiment of the present invention. In FIG. 18, the same reference number is assigned to the part corresponding to that in FIG. 17 and their descriptions are omitted. The program development system in this drawing is provided newly with the ICE (In-Circuit Emulator) 65 and the coding time calculating section 66, instead of the processing time inputting section 61 and coding time calculating section 64. The ICE 65 is provided with an emulation chip having the same function as the CPU constituting the real time control system for which a program is developed and to which various peripheral devices (magnetic head 34a and 34b in the case of the prepaid card selling machine shown in FIG. 2) constituting the real time control system are connected. The In-Circuit Emulator 65, by storing, in advance, the object program stored in the machine code storing section 63 in RAM which can be replaced with ROM and by having the emulation chip read the object program, can perform almost the same processing as if the real time control system were actually operated.

According to the embodiment, the coding time calculating section 66 calculates the processing time and overhead time described in each cell in the state transition matrix based on the executed time obtained by the execution of the object program by the In-Circuit Emulator 65 and stores the result into the storing areas each corresponding to the processing time storing section 44 and the overhead time storing section 45. Moreover, the code simulator can be used instead of the In-Circuit emulator 65.

In operations of the fifth embodiment, the time calculated by taking into consideration the interruption processing, cache hit and miss-hit processing, pipeline processing can be obtained, thus enabling a simulation to be performed with the time being close to actual processing time.

Sixth Embodiment

Figure 19:
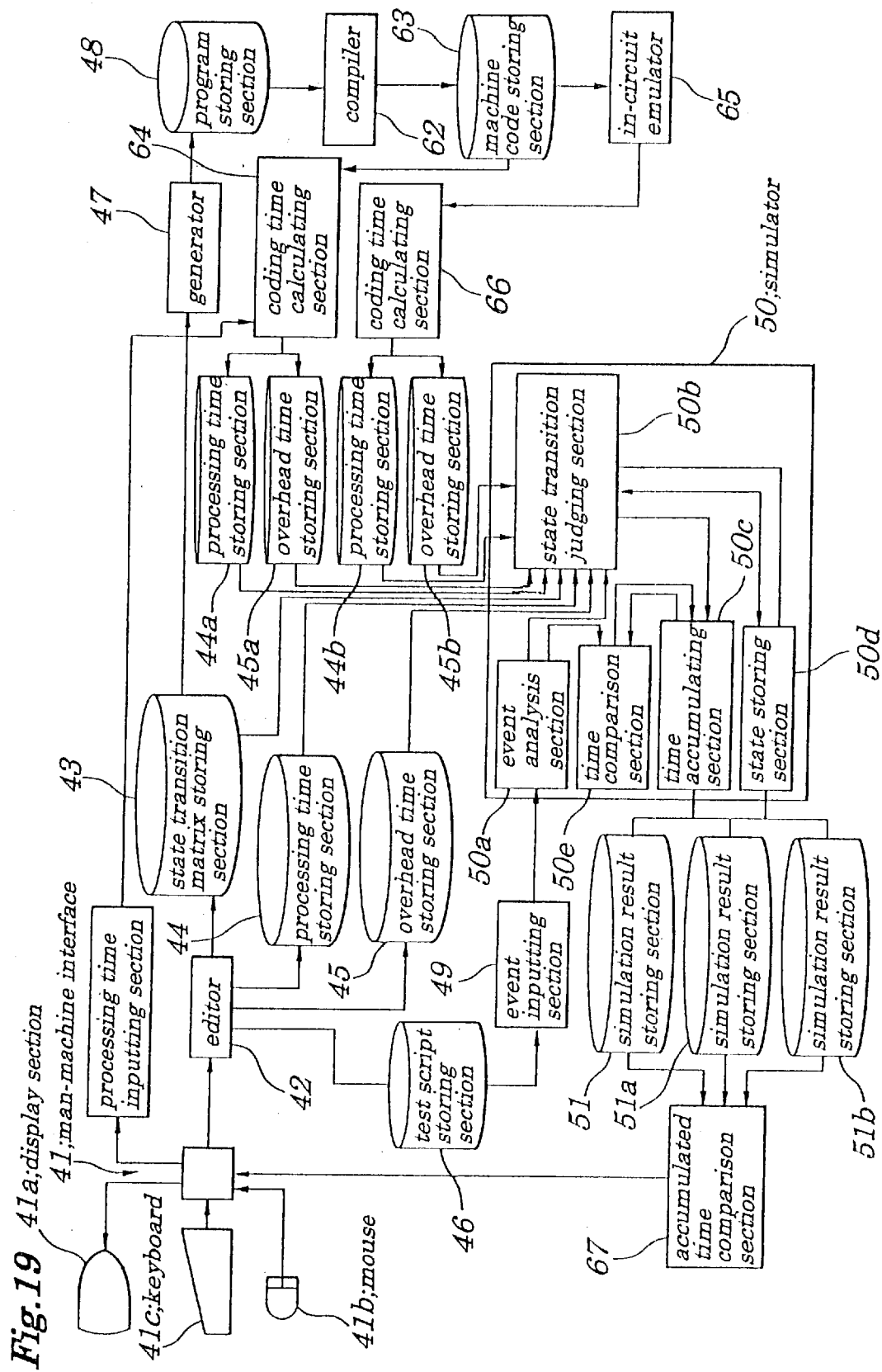
FIG. 19 is a block diagram showing an electrical configuration of the program development system of a sixth embodiment of the present invention.

FIG. 19 is a block diagram showing an electrical configurations of the program development system of a sixth embodiment of the present invention. In FIG. 19, the same reference number is assigned to the part corresponding to that in FIG. 18 and their descriptions are omitted. The program development system shown in the drawing is provided with the processing time inputting section 61 depicted and the coding time calculating section 64 in FIG. 17, and newly with a processing time storing section 44a and 44b, overhead time storing sections 45a and 45b, simulation result storing sections 51a and 51b and an accumulating time comparison section 67.

According to this embodiment, components of the program development system as shown in FIGS. 6, 17 and 18 are combined together. That is, the processing time and overhead time assumed by an operator from experience are stored into the processing time storing section 44 and the overhead time storing section 45 on the basis of which the simulation result is stored in the simulation result storing section 51, and the processing time and overhead time calculated from the object program obtained by compiling a source program using a compiler 62 are stored on the basis of which the simulation result are stored in the simulation result storing section 51a, and the processing time and overhead time obtained by executing the object program by using the In-Circuit emulator 65 are stored in the processing time storing section 44b and then the overhead time storing section 45b on the basis of which the simulation results are stored in the simulation result storing section 51b. The three simulation results obtained by these three methods are compared and reviewed by the accumulated time comparison section 67. The code simulator can be used instead of the In-Circuit emulator 65. Moreover, it is not necessary to obtain all three simulation results described above; i.e., the comparison and review of only two simulation results by the accumulated time comparison section 67 are allowed as well. Thus, in operations of this embodiment, appropriateness of the time assumed by the operator can be checked or verified and the operator's accuracy of the assumption can be improved in the next development of a program for the real time control system.

Moreover, in the sixth embodiment, if the simulation is repeated due to malfunctions in the simulation and, accordingly, the processing time required for the cell in the state transition matrix has to be changed, by using the time assumed by an operator for only the processing time required for the cell now under operation and by using the processing time based on the object program or based on the In-Circuit emulator 65 for the processing time required for other cells, the error in terms of time of a simulation can be reduced.

Seventh Embodiment

Figure 20:
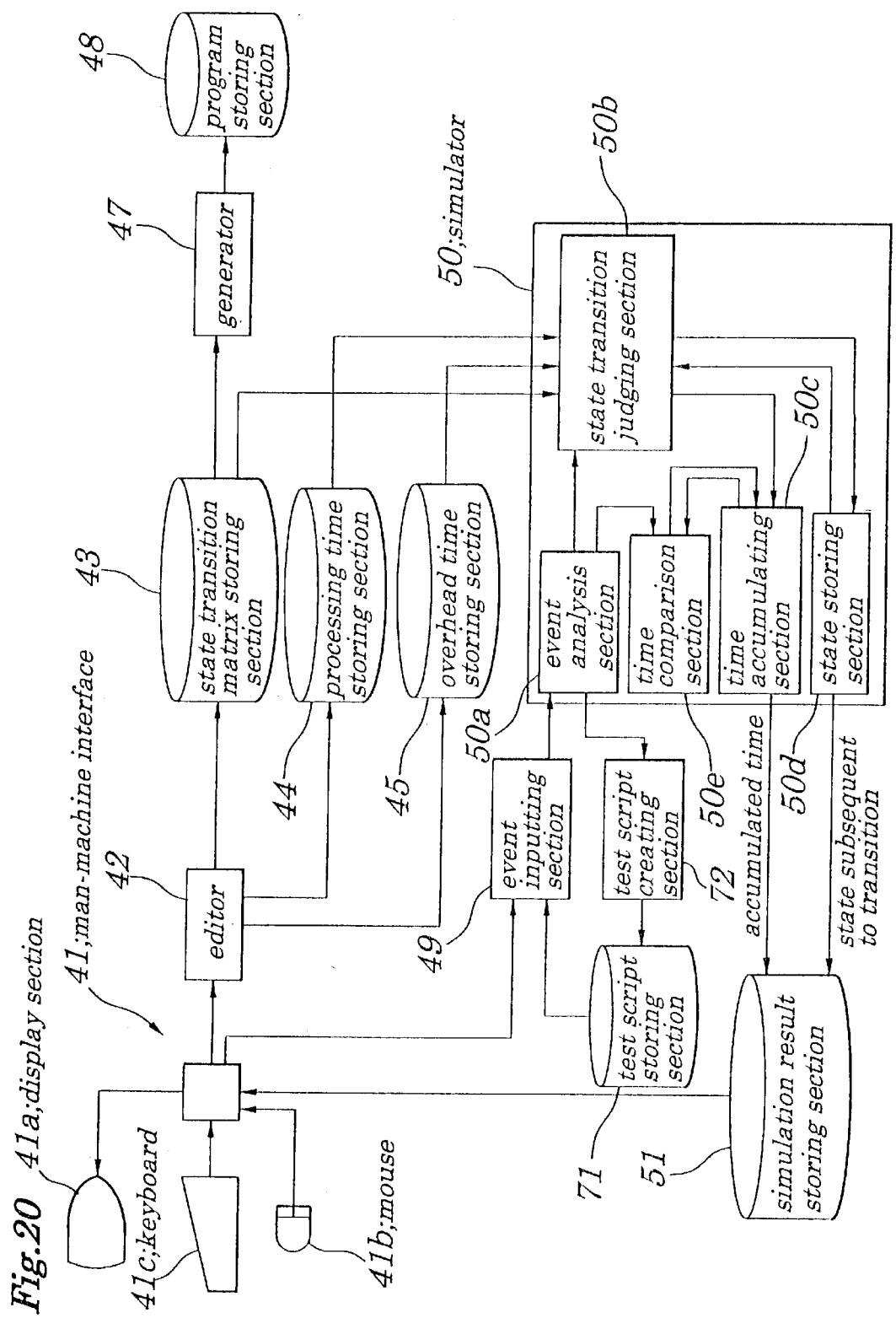
FIG. 20 is a block diagram illustrating an electrical configuration of the program development system of a seventh embodiment of the present invention.

FIG. 20 is a block diagram illustrating an electrical configuration of the program development system of a seventh embodiment of the present invention. In FIG. 20, the same reference number is assigned to the part corresponding to that in FIG. 6 and their descriptions are omitted. The program development system shown in this drawing is provided with a test script storing section 71 and a test script creating section 72, instead of the test script storing section 46. In the operation of this embodiment, in the same manner as in the first embodiment, a test script file is automatically created by using the inputted event log arranged in the order of every one event inputted by the operator and showing a history of execution (execution log) of the simulation based on the same. That is, in the first simulation, in the same manner as in the first embodiment, an operator has the simulator 50 perform a simulation by inputting each event using the mouse 41b and the like, and then the test script creating section 72 automatically creates a test script file and the test script storing section 71 stores it. In the second simulation and thereafter, the test script file is read from the test script storing section 71 and an simulation is performed by the simulator thereby. In this case, the event inputting section 49 is adapted to have the function of the inputting section 17 shown in FIG. 1 and the event analysis section 50a is adapted to have the function of the analysis section 18a.

Thus, according to the configuration of this embodiment, because the creation of the test script file and the simulation can be performed at the same time, it is possible to reduce the time required for the creation and amendment of the test script file and the development period of the program. Furthermore, the inputting is simpler compared with the case where a test script file in a text file is created, thus reducing mistakes in inputting errors.

In operations of each embodiment described above, for example, a single numeric value of "4" is used to represent the processing time in the state transition matrix; however, a value with a certain latitude allowed within a permissible range to specifications, such as values "1 to 5" can be set as well and be stored in the processing time storing section. According to such configurations, in the performance of the first simulation, for example, after the simulator reads a mean value out of values with a certain latitude allowed and performs a simulation, if its result does not meet specifications, in the performance of the second simulation, by reading a minimum value or maximum value or a value randomly selected out of values with a certain latitude allowed, a simulation can be automatically performed. Thus, this allows an automatic simulation until its result meets specifications without bothering an operator. Additionally, an accumulated time can be obtained by performing a simulation under various conditions, for example, of selecting the minimum value only or the maximum value only as the processing time or randomly selecting these values.

In the case of describing the processing time in each cell in the state transition matrix, the same result can be obtained not by describing with a numeric value but by describing with a variable so that the processing time may be changed dynamically within the simulator.

In addition, in operations of the third embodiment, the simulations of operations of both the CPU and the magnetic head being a peripheral device to be performed in series are shown, however, its simulation to be performed in parallel is enabled as well. This is possible because the CPU and the magnetic head (to be exact, the LSI for driving the magnetic head) are independently operated and the CPU, after supplying a request for writing and for reading to the magnetic head, is performing another processing until it receives an interruption signal from the magnetic head. In the operations above, a simulator for operations of the CPU and a simulator for operations of the peripheral devices are provided separately and these simulators, in synchronization with each other, perform a simulation by accumulating the processing time required for each cell described in the corresponding state transition matrix. Such configurations enables an accurate estimation of the processing time even in the case of processing of plural tasks concurrently and in parallel.

Figure 21:
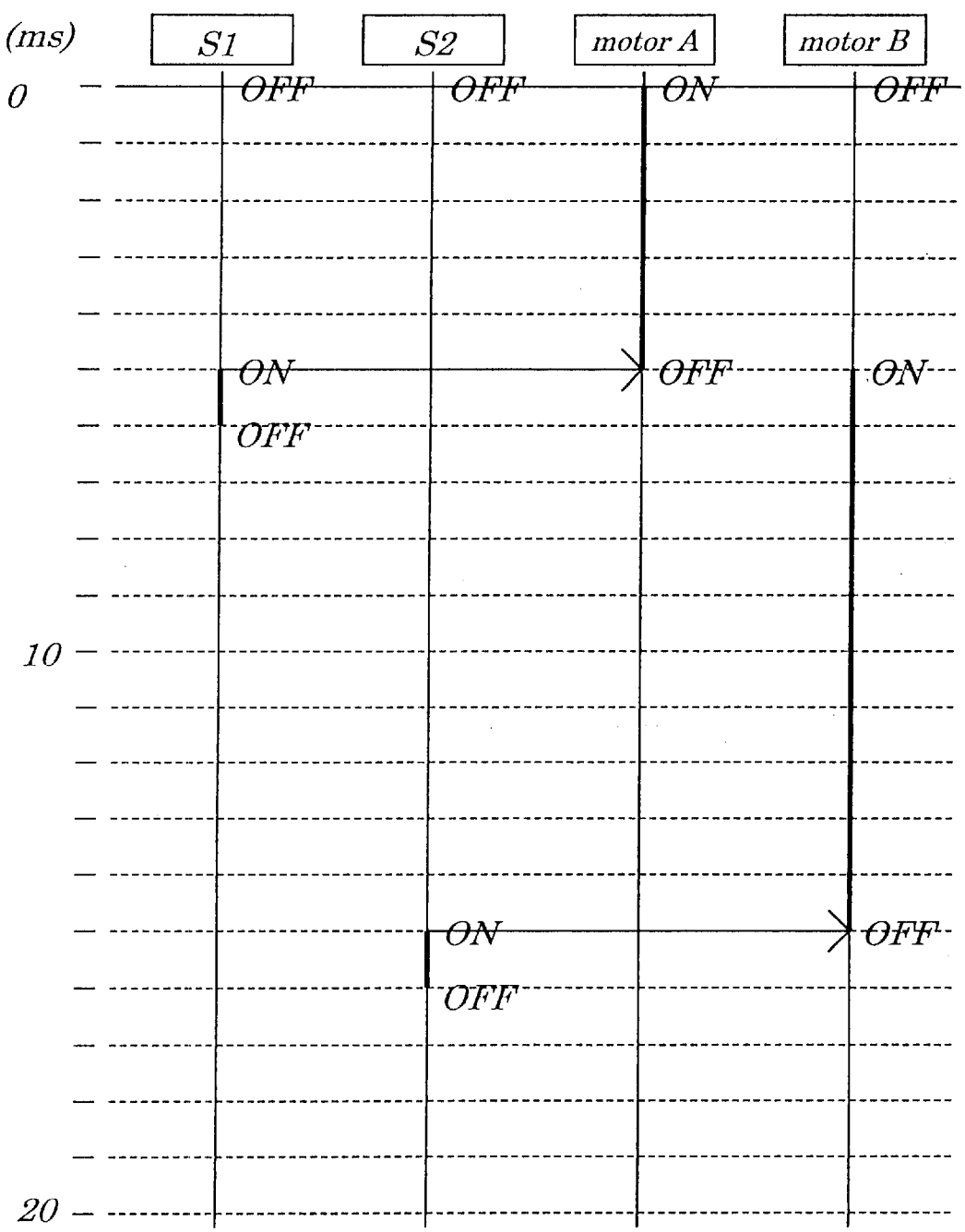
FIG. 21 shows one of examples of a test script file in a message sequence chart format to be used for a simulation in the second embodiment of the present invention.
Figure 22:
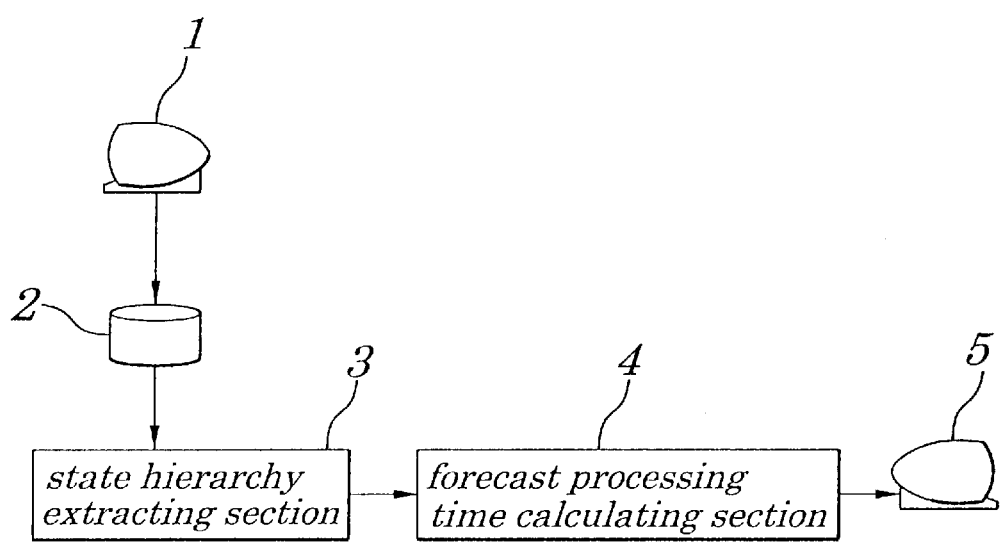
FIG. 22 is a block diagram showing an example of electrical configurations of a conventional program development system.

Moreover, in the embodiments described above, the test script file in a text format as in FIG. 7 or in the timing chart format as in FIG. 13 is used; however, the file format is not limited to these, and as shown in FIG. 21, the test script file in a message-sequence chart format can be used. In FIG. 21, a slender vertical line is an object bar, a name of apart or equipment enclosed by a square at the upper most place represents an object to be simulated or verified and a bold vertical line is a time bar representing continuation time.

In the embodiments described above, an event is supplied externally in any case; however, by defining an event in the state transition matrix in advance, an event can be produced within the simulator.

A variety of functions described in each embodiment can be also applied to the program development system of other embodiments so long as they are allowed in terms of their structures.

In each embodiment described above, though each means is expressed by hardware, the means is not limited to this.

That is, the above program development system can be so configured that it comprises the CPU, an internal memory device such as ROM or RAM or the like, an external memory device such as FDD (Floppy disk driver), HDD (Hard disk driver) and a CD-ROM driver and that the above editors 12 or 42, generators 15 or 47, an inputting section 17, simulators 18 or 50, an event inputting section 49 and the like are composed of CPU, or that these functions are stored, as the program development program, in semiconductor memory such as ROM and memory medium such as FD, HD, or CD-ROM or the like. In the operations above, the internal or external memory devices serve as the state transition storing sections 13 or 43, the processing time storing sections 14 or 44, the overhead time storing section 45, or the test script storing section 46, and the program development program is read from the memory medium into the CPU to control the same. The CPU, when the program development program is actuated, functions as editors 12 or 42, generators 15 or 47, the inputting section 17 or event inputting section 49, simulators 18 or 50, which performs the above processing by the control of the program development program.

As described above, according to configurations of the present invention, since the time information corresponding to each cell in the state transition matrix can be stored on the basis of which the processing time required for the execution of the simulation of the system can be accumulated, the simulation to specifications at the stage of basic design is made possible.

Moreover, according to another configuration of the present invention, since a simulation of a system is performed, based on the state transition matrix and by setting the processing time for every processing described in each cell in the state transition matrix and by taking the overhead time and differential time into consideration, a more realistic simulation is made possible at the stage of basic design.

Furthermore, according to another configuration of the present invention, because the state transition matrix is created for not only operations of the control section but also operations of peripheral devices and the simulation associated with contents described in the state transition matrix is performed, a more realistic simulation at the stage of basic design is made possible.

Also, according to another configuration of the present invention, the simulation is made more accurate than that based on values of processing time or overhead time obtained from experiences and even a less-experienced operator can perform the same accurate simulation as achieved by an experienced operator.

Furthermore, according to another configuration of the present invention, the time calculated by taking into consideration the interruption processing, cache hit and miss-hit processing, pipeline processing can be obtained, thus enabling a simulation to be performed with the time being close to actual processing time.

In addition, according to another configuration of the present invention, appropriateness of the time assumed by the operator can be checked or verified and the operator's accuracy of the assumption can be improved in the next development of a program for the real time control system.

Also, according to another configuration of the present invention, as the creation of the test script file and the simulation can be performed at the same time, it is possible to reduce the time required for the creation and amendment of the test script file and the development period of the program. Furthermore, the inputting is simpler compared with the case where a test script file in a text file is created, thus reducing mistakes in inputting errors.

Also, according to another configuration of the present invention, an automatic simulation can be performed until its result meets specifications without bothering an operator.

Also, according to another configuration of the present invention, an accurate estimation of the processing time is possible even in the case of processing of plural tasks concurrently and in parallel.

This realizes reduction of development period of a program to be incorporated into a real time control system as well as improvement of the quality.

It is thus apparent that the present invention is not limited to the above embodiments but may be changed and modified without departing from the scope and spirit of the invention.

Finally, the present application claims the priority of Japanese Patent Application No. Hei10-189513 filed on Jul. 3, 1998, which is herein incorporated by reference.

What is claimed is:

1. A program development system comprising:
a state transition matrix storing section having two or more cells designated by a state taken by a system for which a program is developed and by an event being a stimulus from the outside or inside of said system, and storing a state transition matrix describing contents of processing to be performed by said system or a state subsequent to transition;
a time information storing section to store time information corresponding to each cell in said state transition matrix; and
a simulator to obtain processing time required for a simulation of operations of said system by accumulating events inputted sequentially and time information corresponding to a cell sequentially designated by a state inputted as an initial state and by a state subsequent to transition.

2. The program development system according to claim 1, wherein it is provided with an inputting section to detect the designation of any of indication positions each corresponding,to two or more events or states constituting said state transition matrix displayed in the display section and to input said positional information about said indication positions into said simulator and wherein said simulator comprises an analysis section to convert positional information inputted by said inputting section to an event code or state code corresponding to said display section, a state storing section to store a state corresponding to said state code or a state subsequent to transition described in each cell, a time accumulating section to accumulate said time information, and a state transition judging section to store a state corresponding to said state code, as said initial state, to said state storing section and to decide a corresponding cell based on an event corresponding to said event code and a state stored in said state storing section and by referring to a state transition matrix read from said state transition matrix storing section and, after reading time information corresponding to the decided cell, to store it to said time accumulating section, and further after reading the state subsequent to transition described in said decided cell, to store it to said state storing section.

3. The program development system according to claim 1, wherein it is provided with an event inputting section to input said initial state and a test script file describing timing of occurrence of each event described in said state transition matrix or timing in operations of constituting factors of said system to be performed to specifications to said simulator and wherein said simulator comprises an event analysis section to create an event inputting sequence obtained by re-arranging, in order of occurrence time, two or more events in a test script file inputted by said event inputting section, a state storing section to store said initial state or a state subsequent to transition described in each cell, a time accumulating section to accumulate said time information, and a state transition judging section to store said initial state into a state storing section and to judge a cell based on an event to be captured, in order of an earlier time, from said event inputting sequence and the state stored in said state storing section and by referring to a state transition matrix read from said state transition matrix storing section and, after reading time information corresponding to the decided cell from said time information storing section, to accumulate it in said time accumulating section and, after reading a state subsequent to transition described in the decided cell from said state transition matrix storing section, to store it to said state storing section.

4. The program development system according to claim 3, wherein it has a test script file creating section to create said test script file from history data of execution of the simulation performed by said simulator based on said initial state inputted by manipulating an operation section and said two or more events.

5. The program development system according to claim 3, wherein said test script file is in a timing chart format, text format or message sequence chart format.

6. The program development system according to claim 1, wherein said simulator is provided with a time comparison section adapted to subtract accumulated time being currently stored in said time accumulating section from occurrence time of said event and, if a positive result is obtained by the subtraction, to add the subtraction result, as a differential time, which is a difference between processing time required for instructions for processing of operations of peripheral devices from a control section constituting said system and processing time required for operations of peripheral devices to be performed in accordance with said processing instructions to the accumulated time being currently stored in said time accumulating section.

7. The program development system according to claim 1, wherein said state transition matrix storing section stores a state transition matrix of operations of a control section constituting said system and a state transition matrix of operations of peripheral devices controlled by said control section and wherein said time information storing section stores time information about operations of said control section and time information about operations of said peripheral devices, and wherein said simulator is composed of a first simulator to accumulate time information about operations of said control section and a second simulator to accumulate time information about operations of said peripheral devices independently of said first simulator.

8. The program development system according to claim 1, wherein it is provided with a generator to create a source program written in a programming language to be incorporated into said system based on said state transition matrix, a compiler to convert said source program to an object program written in a machine language, a first calculating section to calculate time information corresponding to each cell by multiplying an operational speed of said control section constituting said system by code numbers of a machine language constituting said object program corresponding to the processing described in each cell in said state transition matrix or to transition before and after it.

9. The program development system according to claim 1, wherein it is provided with a generator to create a source program written in a programming language to be incorporated into said system based on said state transition matrix, a compiler to convert said source program to an object program written in a machine language, an In-Circuit emulator or a code simulator adapted to execute said object program to allow processing of almost the same as actual operations of said system, and a second calculating section to calculate time information corresponding to each cell in said state transition matrix based on execution time obtained by the execution of said object program by said In-Circuit emulator or said code simulator.

10. The program development system according to claim 9, wherein said time information storing section is composed of, at least two out of a first time information storing section to store time information inputted by manipulating said control section corresponding to each cell in said state transition matrix, a second time information storing section to store time information calculated by said first calculating section corresponding to each cell in said state transition matrix, or a third time information storing section to store time information calculated by said second calculating section corresponding to each cell in said state transition matrix, and a comparison section adapted to said simulator to compare accumulated results obtained by accumulating the corresponding time information at the time of simulation based on time information stored in at least two out of said time information storing sections 1 to 3.

11. The program development system according to claim 1, wherein said time information storing section or said first time information storing section stores time information as values with a certain latitude or variables in accordance with a permissible range in specifications of said system and wherein said simulator is adapted to read the maximum value, minimum value, average values or values randomly selected out of said values with a certain latitude when time information corresponding to a specified cell is read from said time information storing section or said first time information storing section or to change the time information to be accumulated in accordance with said variables.

12. The program development system according to claim 1, wherein said time information is processing time required for processing described in a corresponding cell.

13. The program development system according to claim 12, wherein said time information consists of said processing time and overhead time required for transition from a state or a processing to another state or another processing.

14. The program development system according to claim 13, wherein said overhead time i s uniform o r varies depending on each cell or each transition.

15. A method for developing a program comprising the steps of:
employing a state transition matrix storing section having two or more cells designated by a state taken by a system for which a program is developed and by an event being a stimulus from the outside or inside of said system, and storing a state transition matrix describing contents of processing to be performed by said system or a state subsequent to transition;
employing a time information storing section to store time information corresponding to each cell in said state transition matrix; and
obtaining processing time required for a simulation of operations of said system by accumulating events inputted sequentially and time information corresponding to a cell sequentially designated by a state inputted as an initial state and by a state subsequent to transition.

16. The method of developing a program according to claim 15, comprising the steps of:
employing an inputting section to detect the designation of any of indication positions each corresponding to two or more events or states constituting said state transition matrix displayed in the display section and to input said positional information about said indication positions into said simulator;
converting positional information inputted by said inputting section to an event code or state code corresponding to the display position;
storing a state corresponding said state code as said initial state to a state storing section;
deciding a cell based on an event corresponding to said event code and a state stored in said state storing section and by referring to a state transition matrix read from said state transition storing section;
reading time information corresponding to said decided cell from said time information storing section and accumulating it in the time accumulating section; and
reading a state subsequent to transition described in said decided cell from said state transition matrix storing section and of storing it to said state storing section.

17. The method for developing a program according to claim 15, comprising the steps of:
employing an event inputting section to input said initial state and a test script file describing timing of occurrence of each event described in said state transition matrix or timing in operations of constituting factors of said system to be performed to specifications;
creating an event inputting sequence obtained by re-arranging, in order of occurrence time, two or more events in a test script file inputted by said event inputting section;
storing said initial state to a state storing section;
deciding a corresponding cell based on an event captured in order of an earlier time from said event inputting sequence and a state stored in said state storing section and by referring to a state transition matrix read from said state transition storing section;
reading time information corresponding to said decided cell from said time information storing section and accumulating it from a time accumulating section; and
reading a state subsequent transition described in said decided cell from said state transition matrix storing section and storing it to said state storing section.

18. The method for developing a program according to claim 17, comprising the step of creating said test script file from history data of execution of the simulation performed by said simulator based on said initial state inputted by manipulating an operation section and said two or more events.

19. The method for developing a program according to claim 17 comprising the step of using said test script file being in a timing chart format, in a text file format or in a message sequence chart format.

20. The method for developing a program according to claim 15 comprising the steps of subtracting accumulated time being currently stored in said time accumulating section from occurrence time of said event and, if a positive result is obtained by the subtraction, and of adding the subtraction result, as a differential time, which is a difference between processing time required for instructions for processing of operations of peripheral devices from a control section constituting said system and processing time required for operations of peripheral devices to be performed in accordance with said processing instructions to the accumulated time being currently stored in said time accumulating section.

21. The method for developing a program according to claim 15 comprising the steps of storing a state transition matrix of operations of a control section constituting said system and a state transition matrix of operations of peripheral devices controlled by said control section to said state transition matrix storing section, storing time information about operations of said control section and time information about operations of said peripheral devices to said time information storing section, accumulating time information about operations of said control section and accumulating time information about operations of said peripheral devices independently of said steps.

22. The method for developing a program according to claim 15 comprising the steps of creating a source program written in a programming language to be incorporated into said system based on said state transition matrix, converting said source program to an object program written in a machine language, and calculating time information corresponding to each cell by multiplying an operational speed of said control section constituting said system by code numbers of a machine language constituting said object program corresponding to the processing described in each cell in said state transition matrix or to transition before and after it.

23. The method for developing a program according to claim 15 comprising the steps of creating a source program written in a programming language to be incorporated into said system based on said state transition matrix, converting said source program to an object program written in a machine language, executing said object program and calculating time information corresponding to each cell in said state transition matrix based on execution time obtained by the execution of said object program.

24. The method for developing a program according to claim 23 comprising the steps of employing said time information storing section composed of, at least two out of a first time information storing section to store time information inputted by manipulating said control section corresponding to each cell in said state transition matrix, a second time information storing section to store time information calculated by said first calculating section corresponding to each cell in said state transition matrix, or a third time information storing section to store time information calculated by said second calculating section corresponding to each cell in said state transition matrix, and comparing accumulated results obtained by accumulating the corresponding time information at the time of simulation based on time information stored in at least two out of said time information storing sections 1 to 3.

25. The method for developing a program according to claim 15 comprising the steps of employing said time information storing section or said first time information storing section which stores time information as values with a certain latitude or variables in accordance with a permissible range in specifications of said system, reading the maximum value, minimum value, average values or values randomly selected out of said values with a certain latitude when time information corresponding to a specified cell is read from said time information storing section or said first time information storing section or changing the time information to be accumulated in accordance with said variables.

26. The method for developing a program according to claim 15 comprising the step of using said time information which is processing time required for execution of processing described in. a corresponding cell.

27. The method for developing a program according to claim 26 comprising the step of using said time information which is overhead time required for transition from a state or a processing to another state or another processing.

28. The method for developing a program according to claim 27 comprising the step of using said overhead time which is uniform or varies depending on each cell or each transition.

29. A storage medium storing programs for development of programs to have a computer achieve functions described in claim 1.

30. A storage medium storing programs for development of programs to have a computer achieve functions described in claim 15.

* * * * *

UNITED STATES PATENT AND TRADEMARK OFFICE
CERTIFICATE OF CORRECTION

PATENT NO.        : 6,467,078 B1                                       Page 1 of 1
APPLICATION NO.   : 09/346233
DATED             : October 15, 2002
INVENTOR(S)       : Harumi Matsuba et al.

It is certified that error appears in the above-identified patent and that said Letters Patent is hereby corrected as shown below:

Title Page
(73) Assignee: should read

NEC Corporation
Tokyo, Japan

Cats Co., Ltd.
Kanagawa, Japan

Signed and Sealed this

Eighteenth Day of May, 2010

David J. Kappos
*Director of the United States Patent and Trademark Office*